US009531425B2

(12) United States Patent
McCormack et al.

(10) Patent No.: US 9,531,425 B2
(45) Date of Patent: Dec. 27, 2016

(54) MODULAR ELECTRONICS

(71) Applicant: Keyssa, Inc., Mountain View, CA (US)

(72) Inventors: Gary D. McCormack, Tigard, OR (US); Roger Isaac, San Jose, CA (US); Ian A. Kyles, West Linn, OR (US)

(73) Assignee: Keyssa, Inc., Campbell, CA (US)

( * ) Notice: Subject to any disclaimer, the term of this patent is extended or adjusted under 35 U.S.C. 154(b) by 0 days.

(21) Appl. No.: 14/109,938

(22) Filed: Dec. 17, 2013

(65) Prior Publication Data

US 2014/0169486 A1 Jun. 19, 2014

Related U.S. Application Data

(60) Provisional application No. 61/738,297, filed on Dec. 17, 2012.

(51) Int. Cl.
H04B 1/40 (2015.01)
G09G 3/20 (2006.01)
G06F 1/16 (2006.01)
G06F 1/18 (2006.01)
H04B 1/38 (2015.01)
(Continued)

(52) U.S. Cl.
CPC ............ *H04B 1/40* (2013.01); *G06F 1/1626* (2013.01); *G06F 1/181* (2013.01); *G06F 1/182* (2013.01); *G09G 3/2096* (2013.01); *H04B 5/0037* (2013.01); *G09G 5/003* (2013.01); *G09G 2330/00* (2013.01); *H04B 5/0012* (2013.01); *H04B 5/0075* (2013.01)

(58) Field of Classification Search
CPC ... H05B 5/0012; H05B 5/0037; H05B 5/0075; H05B 5/0031
USPC .................................. 455/41.1, 73, 81, 572
See application file for complete search history.

(56) References Cited

U.S. PATENT DOCUMENTS 2,753,551 A 7/1956 Richmond
3,796,831 A 3/1974 Bauer
(Continued)

FOREIGN PATENT DOCUMENTS

CN 2237914 Y 10/1996
CN 1178402 A 4/1998
(Continued)

OTHER PUBLICATIONS

Future Technology Devices International Ltd., "Technical Note TN_113 Simplified Description of USB Device Enumeration", Document Ref. No. FT_000180, Version 1.0, Oct. 28, 2009, 19 pages.

(Continued)

*Primary Examiner* — Ayodeji Ayotunde
(74) *Attorney, Agent, or Firm* — Fenwick & West LLP

(57) ABSTRACT

A computing device includes an integrated unit having a plurality of functional components, and an extremely high frequency (EHF) communication unit operatively coupled to the integrated unit. The EHF communication unit includes a transducer configured to transmit and receive EHF electromagnetic signals, and convert between electrical signals and electromagnetic signals. The computing device includes a transceiver operatively coupled to the transducer. The EHF communication unit may enable at least one of the functional components of the computing device to be supplemented by a functional component of an external computing device.

30 Claims, 16 Drawing Sheets

(51) Int. Cl.
*G09G 5/00* (2006.01)
*H04B 5/00* (2006.01)

(56) References Cited

U.S. PATENT DOCUMENTS

| | | |
|---|---|---|
| 3,971,930 A | 7/1976 | Fitzmaurice et al. |
| 3,987,365 A | 10/1976 | Okada et al. |
| 4,293,833 A | 10/1981 | Popa |
| 4,485,312 A | 11/1984 | Kusakabe et al. |
| 4,497,068 A | 1/1985 | Fischer |
| 4,525,693 A | 6/1985 | Suzuki et al. |
| 4,694,504 A | 9/1987 | Porter et al. |
| 4,771,294 A * | 9/1988 | Wasilousky ............... 343/853 |
| 4,800,350 A | 1/1989 | Bridges et al. |
| 4,875,026 A | 10/1989 | Walter et al. |
| 4,946,237 A | 8/1990 | Arroyo et al. |
| 5,164,942 A | 11/1992 | Kamerman et al. |
| 5,199,086 A | 3/1993 | Johnson et al. |
| 5,471,668 A | 11/1995 | Soenen et al. |
| 5,543,808 A | 8/1996 | Feigenbaum et al. |
| 5,621,913 A | 4/1997 | Tuttle et al. |
| 5,749,052 A | 5/1998 | Hidem et al. |
| 5,754,948 A | 5/1998 | Metze |
| 5,773,878 A | 6/1998 | Lim et al. |
| 5,786,626 A | 7/1998 | Brady et al. |
| 5,861,782 A | 1/1999 | Saitoh |
| 5,921,783 A | 7/1999 | Fritsch et al. |
| 5,941,729 A | 8/1999 | Sri-Jayantha |
| 5,943,374 A | 8/1999 | Kokuryo et al. |
| 5,956,626 A | 9/1999 | Kaschke et al. |
| 6,011,785 A | 1/2000 | Carney |
| 6,072,433 A | 6/2000 | Young et al. |
| 6,252,767 B1 | 6/2001 | Carlson |
| 6,351,237 B1 | 2/2002 | Martek et al. |
| 6,373,447 B1 | 4/2002 | Rostoker et al. |
| 6,490,443 B1 | 12/2002 | Freeny, Jr. |
| 6,492,973 B1 | 12/2002 | Kuroki et al. |
| 6,534,784 B2 | 3/2003 | Eliasson et al. |
| 6,542,720 B1 | 4/2003 | Tandy |
| 6,590,544 B1 | 7/2003 | Filipovic |
| 6,607,136 B1 | 8/2003 | Atsmon et al. |
| 6,647,246 B1 | 11/2003 | Lu |
| 6,718,163 B2 | 4/2004 | Tandy |
| 6,768,770 B1 | 7/2004 | Lipperer |
| 6,803,841 B2 | 10/2004 | Saitoh et al. |
| 6,915,529 B1 | 7/2005 | Suematsu et al. |
| 6,967,347 B2 | 11/2005 | Estes et al. |
| 7,050,763 B2 | 5/2006 | Stengel et al. |
| 7,107,019 B2 | 9/2006 | Tandy |
| 7,113,087 B1 | 9/2006 | Casebolt et al. |
| 7,213,766 B2 | 5/2007 | Ryan et al. |
| 7,311,526 B2 | 12/2007 | Rohrbach et al. |
| 7,512,395 B2 | 3/2009 | Beukema et al. |
| 7,517,222 B2 | 4/2009 | Rohrbach et al. |
| 7,593,708 B2 | 9/2009 | Tandy |
| 7,598,923 B2 | 10/2009 | Hardacker et al. |
| 7,599,427 B2 | 10/2009 | Bik |
| 7,612,630 B2 | 11/2009 | Miller |
| 7,617,342 B2 | 11/2009 | Rofougaran |
| 7,645,143 B2 | 1/2010 | Rohrbach et al. |
| 7,656,205 B2 | 2/2010 | Chen et al. |
| 7,664,461 B2 | 2/2010 | Rofougaran et al. |
| 7,760,045 B2 | 7/2010 | Kawasaki |
| 7,761,092 B2 | 7/2010 | Desch et al. |
| 7,768,457 B2 | 8/2010 | Pettus et al. |
| 7,769,347 B2 | 8/2010 | Louberg et al. |
| 7,778,621 B2 | 8/2010 | Tandy |
| 7,791,167 B1 | 9/2010 | Rofougaran |
| 7,820,990 B2 | 10/2010 | Schroeder et al. |
| 7,881,675 B1 | 2/2011 | Gazdzinski |
| 7,881,753 B2 | 2/2011 | Rofougaran |
| 7,889,022 B2 | 2/2011 | Miller |
| 7,907,924 B2 | 3/2011 | Kawasaki |
| 7,929,474 B2 | 4/2011 | Pettus et al. |
| 7,975,079 B2 | 7/2011 | Bennett et al. |
| 8,013,610 B1 | 9/2011 | Merewether et al. |
| 8,014,416 B2 | 9/2011 | Ho et al. |
| 8,023,886 B2 | 9/2011 | Rofougaran |
| 8,036,629 B2 | 10/2011 | Tandy |
| 8,041,227 B2 | 10/2011 | Holcombe et al. |
| 8,063,769 B2 | 11/2011 | Rofougaran |
| 8,081,699 B2 | 12/2011 | Siwiak et al. |
| 8,087,939 B2 | 1/2012 | Rohrbach et al. |
| 8,121,542 B2 | 2/2012 | Zack et al. |
| 8,131,645 B2 | 3/2012 | Lin et al. |
| 8,183,935 B2 | 5/2012 | Milano et al. |
| 8,244,175 B2 | 8/2012 | Rofougaran |
| 8,244,179 B2 | 8/2012 | Dua |
| 8,279,611 B2 | 10/2012 | Wong et al. |
| 8,339,258 B2 | 12/2012 | Rofougaran |
| 8,346,847 B2 | 1/2013 | Steakley |
| 8,422,482 B2 | 4/2013 | Sugita |
| 8,554,136 B2 | 10/2013 | McCormack |
| 8,634,767 B2 | 1/2014 | Rofougaran et al. |
| 8,755,849 B2 | 6/2014 | Rofougaran et al. |
| 8,794,980 B2 | 8/2014 | McCormack |
| 8,811,526 B2 | 8/2014 | McCormack et al. |
| 8,812,833 B2 | 8/2014 | Liu et al. |
| 8,939,773 B2 | 1/2015 | McCormack |
| 9,374,154 B2 | 6/2016 | Kyles et al. |
| 2002/0008665 A1 | 1/2002 | Takenoshita |
| 2002/0027481 A1 | 3/2002 | Fiedziuszko |
| 2002/0058484 A1 | 5/2002 | Bobier et al. |
| 2002/0106041 A1 | 8/2002 | Chang et al. |
| 2002/0118083 A1 | 8/2002 | Pergande |
| 2002/0140584 A1 | 10/2002 | Maeda et al. |
| 2003/0025626 A1 | 2/2003 | McEwan |
| 2003/0088404 A1 | 5/2003 | Koyanagi |
| 2003/0137371 A1 | 7/2003 | Saitoh et al. |
| 2004/0043734 A1 | 3/2004 | Hashidate |
| 2004/0160294 A1 | 8/2004 | Elco |
| 2004/0214621 A1 | 10/2004 | Ponce De Leon et al. |
| 2005/0032474 A1 | 2/2005 | Gordon |
| 2005/0099242 A1 | 5/2005 | Sano |
| 2005/0109841 A1 | 5/2005 | Ryan et al. |
| 2005/0124307 A1 | 6/2005 | Ammar |
| 2005/0140436 A1 | 6/2005 | Ichitsubo et al. |
| 2006/0003710 A1 | 1/2006 | Nakagawa et al. |
| 2006/0029229 A1 | 2/2006 | Trifonov et al. |
| 2006/0038168 A1 | 2/2006 | Estes et al. |
| 2006/0051981 A1 | 3/2006 | Neidlein et al. |
| 2006/0077043 A1 | 4/2006 | Amtmann et al. |
| 2006/0082518 A1 | 4/2006 | Ram |
| 2006/0128372 A1 | 6/2006 | Gazzola |
| 2006/0140305 A1 | 6/2006 | Netsell et al. |
| 2006/0159158 A1 | 7/2006 | Moore et al. |
| 2006/0166740 A1 | 7/2006 | Sufuentes |
| 2006/0258289 A1 | 11/2006 | Dua |
| 2006/0276157 A1 | 12/2006 | Chen et al. |
| 2007/0010295 A1 | 1/2007 | Greene |
| 2007/0024504 A1 | 2/2007 | Matsunaga |
| 2007/0035917 A1 | 2/2007 | Hotelling et al. |
| 2007/0063056 A1 | 3/2007 | Gaucher et al. |
| 2007/0147425 A1 | 6/2007 | Lamoureux et al. |
| 2007/0229270 A1 | 10/2007 | Rofougaran |
| 2007/0242621 A1 | 10/2007 | Nandagopalan et al. |
| 2007/0273476 A1 | 11/2007 | Yamazaki et al. |
| 2007/0278632 A1 | 12/2007 | Zhao et al. |
| 2008/0002652 A1 | 1/2008 | Gupta et al. |
| 2008/0055093 A1 | 3/2008 | Shkolnikov et al. |
| 2008/0055303 A1 | 3/2008 | Ikeda |
| 2008/0089667 A1 | 4/2008 | Grady et al. |
| 2008/0112101 A1 | 5/2008 | McElwee et al. |
| 2008/0142250 A1 | 6/2008 | Tang |
| 2008/0143435 A1 | 6/2008 | Wilson et al. |
| 2008/0150799 A1 | 6/2008 | Hemmi et al. |
| 2008/0150821 A1 | 6/2008 | Koch et al. |
| 2008/0159243 A1 | 7/2008 | Rofougaran |
| 2008/0165002 A1 | 7/2008 | Tsuji |
| 2008/0165065 A1 | 7/2008 | Hill et al. |
| 2008/0192726 A1 | 8/2008 | Mahesh et al. |
| 2008/0195788 A1 | 8/2008 | Tamir et al. |
| 2008/0197973 A1 | 8/2008 | Enguent |
| 2008/0238632 A1 | 10/2008 | Endo et al. |

(56) References Cited

U.S. PATENT DOCUMENTS

| | | |
|---|---|---|
| 2008/0289426 A1 | 11/2008 | Kearns et al. |
| 2008/0290959 A1 | 11/2008 | Ali et al. |
| 2008/0293446 A1 | 11/2008 | Rofougaran |
| 2009/0006677 A1 | 1/2009 | Rofougaran |
| 2009/0009337 A1 | 1/2009 | Rofougaran |
| 2009/0015353 A1 | 1/2009 | Rofougaran |
| 2009/0028177 A1 | 1/2009 | Pettus et al. |
| 2009/0029659 A1 | 1/2009 | Gonzalez |
| 2009/0033455 A1 | 2/2009 | Strat et al. |
| 2009/0037628 A1 | 2/2009 | Rofougaran |
| 2009/0073070 A1 | 3/2009 | Rofougaran |
| 2009/0075688 A1 | 3/2009 | Rofougaran |
| 2009/0086844 A1 | 4/2009 | Rofougaran |
| 2009/0091486 A1 | 4/2009 | Wiesbauer et al. |
| 2009/0094506 A1 | 4/2009 | Lakkis |
| 2009/0098826 A1 | 4/2009 | Zack et al. |
| 2009/0110131 A1 | 4/2009 | Bornhoft et al. |
| 2009/0111390 A1 | 4/2009 | Sutton et al. |
| 2009/0175323 A1 | 7/2009 | Chung |
| 2009/0180408 A1 | 7/2009 | Graybeal et al. |
| 2009/0189873 A1 | 7/2009 | Peterson et al. |
| 2009/0218407 A1 | 9/2009 | Rofougaran |
| 2009/0218701 A1 | 9/2009 | Rofougaran |
| 2009/0236701 A1 | 9/2009 | Sun et al. |
| 2009/0237317 A1* | 9/2009 | Rofougaran .................. 343/772 |
| 2009/0239392 A1 | 9/2009 | Sumitomo et al. |
| 2009/0239483 A1 | 9/2009 | Rofougaran |
| 2009/0245808 A1 | 10/2009 | Rofougaran |
| 2009/0257445 A1 | 10/2009 | Chan et al. |
| 2009/0280765 A1 | 11/2009 | Rofougaran et al. |
| 2009/0310649 A1 | 12/2009 | Fisher et al. |
| 2010/0009627 A1 | 1/2010 | Huomo |
| 2010/0063866 A1 | 3/2010 | Kinoshita et al. |
| 2010/0071031 A1 | 3/2010 | Carter et al. |
| 2010/0103045 A1 | 4/2010 | Liu et al. |
| 2010/0120406 A1 | 5/2010 | Banga et al. |
| 2010/0127804 A1 | 5/2010 | Vouloumanos |
| 2010/0149149 A1* | 6/2010 | Lawther ........................ 345/211 |
| 2010/0159829 A1 | 6/2010 | McCormack |
| 2010/0167645 A1 | 7/2010 | Kawashimo |
| 2010/0202345 A1 | 8/2010 | Jing et al. |
| 2010/0202499 A1 | 8/2010 | Lee et al. |
| 2010/0203833 A1 | 8/2010 | Dorsey |
| 2010/0231452 A1 | 9/2010 | Babakhani et al. |
| 2010/0260274 A1 | 10/2010 | Yamada et al. |
| 2010/0265648 A1* | 10/2010 | Hirabayashi ............. 361/679.28 |
| 2010/0277394 A1 | 11/2010 | Haustein et al. |
| 2010/0282849 A1 | 11/2010 | Mair |
| 2010/0283700 A1 | 11/2010 | Rajanish et al. |
| 2010/0285634 A1 | 11/2010 | Rofougaran |
| 2010/0297954 A1 | 11/2010 | Rofougaran et al. |
| 2010/0315954 A1 | 12/2010 | Singh et al. |
| 2011/0009078 A1 | 1/2011 | Kawamura |
| 2011/0012727 A1 | 1/2011 | Pance et al. |
| 2011/0038282 A1 | 2/2011 | Mihota et al. |
| 2011/0044404 A1 | 2/2011 | Vromans |
| 2011/0047588 A1 | 2/2011 | Takeuchi et al. |
| 2011/0050446 A1 | 3/2011 | Anderson et al. |
| 2011/0084398 A1 | 4/2011 | Pilard et al. |
| 2011/0092212 A1 | 4/2011 | Kubota |
| 2011/0122932 A1 | 5/2011 | Lovberg |
| 2011/0127954 A1 | 6/2011 | Walley et al. |
| 2011/0181484 A1 | 7/2011 | Pettus et al. |
| 2011/0197237 A1 | 8/2011 | Turner |
| 2011/0207425 A1 | 8/2011 | Juntunen et al. |
| 2011/0221582 A1 | 9/2011 | Chuey et al. |
| 2011/0249659 A1 | 10/2011 | Fontaine et al. |
| 2011/0250928 A1 | 10/2011 | Schlub et al. |
| 2011/0285606 A1 | 11/2011 | De Graauw et al. |
| 2011/0286703 A1 | 11/2011 | Kishima et al. |
| 2011/0292972 A1 | 12/2011 | Budianu et al. |
| 2011/0311231 A1 | 12/2011 | Ridgway et al. |
| 2012/0009880 A1 | 1/2012 | Trainin et al. |
| 2012/0013499 A1 | 1/2012 | Hayata |
| 2012/0028582 A1 | 2/2012 | Tandy |
| 2012/0064664 A1 | 3/2012 | Yamazaki et al. |
| 2012/0069772 A1 | 3/2012 | Byrne et al. |
| 2012/0072620 A1 | 3/2012 | Jeong et al. |
| 2012/0082194 A1 | 4/2012 | Tam et al. |
| 2012/0083137 A1 | 4/2012 | Rohrbach et al. |
| 2012/0091799 A1 | 4/2012 | Rofougaran et al. |
| 2012/0110635 A1 | 5/2012 | Harvey et al. |
| 2012/0126794 A1 | 5/2012 | Jensen et al. |
| 2012/0139768 A1 | 6/2012 | Loeda et al. |
| 2012/0219039 A1 | 8/2012 | Feher |
| 2012/0249366 A1 | 10/2012 | Pozgay et al. |
| 2012/0263244 A1 | 10/2012 | Kyles et al. |
| 2012/0265596 A1 | 10/2012 | Mazed et al. |
| 2012/0286049 A1 | 11/2012 | McCormack et al. |
| 2012/0290760 A1 | 11/2012 | McCormack et al. |
| 2012/0295539 A1 | 11/2012 | McCormack et al. |
| 2012/0307932 A1 | 12/2012 | McCormack et al. |
| 2012/0319496 A1 | 12/2012 | McCormack et al. |
| 2012/0319890 A1 | 12/2012 | McCormack et al. |
| 2013/0070817 A1 | 3/2013 | McCormack et al. |
| 2013/0106673 A1 | 5/2013 | McCormack et al. |
| 2013/0109303 A1 | 5/2013 | McCormack et al. |
| 2013/0157477 A1 | 6/2013 | McCormack |
| 2013/0183903 A1 | 7/2013 | McCormack et al. |
| 2013/0196598 A1 | 8/2013 | McCormack et al. |
| 2013/0257670 A1* | 10/2013 | Sovero .................... H01Q 1/24 343/833 |
| 2013/0278360 A1 | 10/2013 | Kim et al. |
| 2013/0316653 A1 | 11/2013 | Kyles et al. |
| 2014/0038521 A1 | 2/2014 | McCormack |
| 2014/0043208 A1 | 2/2014 | McCormack et al. |
| 2014/0148193 A1 | 5/2014 | Kogan et al. |
| 2014/0266331 A1 | 9/2014 | Arora |
| 2014/0269414 A1 | 9/2014 | Hyde et al. |
| 2015/0111496 A1 | 4/2015 | McCormack et al. |

FOREIGN PATENT DOCUMENTS

| | | |
|---|---|---|
| CN | 2313296 Y | 4/1999 |
| CN | 1389988 A | 1/2003 |
| CN | 1781255 A | 5/2006 |
| CN | 101090179 A | 12/2007 |
| CN | 101496298 A | 7/2009 |
| CN | 201562854 U | 8/2010 |
| CN | 102156510 A | 8/2011 |
| CN | 104937956 A | 9/2015 |
| EP | 0152246 A2 | 8/1985 |
| EP | 0515187 A2 | 11/1992 |
| EP | 0789421 A2 | 8/1997 |
| EP | 0884799 A2 | 12/1998 |
| EP | 0896380 A2 | 2/1999 |
| EP | 0996189 A2 | 4/2000 |
| EP | 1041666 A1 | 10/2000 |
| EP | 1298809 A2 | 4/2003 |
| EP | 1357395 A1 | 10/2003 |
| EP | 1798867 A2 | 6/2007 |
| EP | 2106192 A2 | 9/2009 |
| EP | 2309608 A1 | 4/2011 |
| EP | 2328226 A1 | 6/2011 |
| EP | 2360923 A1 | 8/2011 |
| GB | 817349 | 7/1959 |
| GB | 2217114 | 10/1989 |
| JP | 52-72502 A | 6/1977 |
| JP | 5-236031 A | 9/1993 |
| JP | 5-327788 A | 12/1993 |
| JP | 07-006817 A | 1/1995 |
| JP | 9-83538 A | 3/1997 |
| JP | 10-13296 A | 1/1998 |
| JP | H10-065568 A | 3/1998 |
| JP | H11-298343 A | 10/1999 |
| JP | 2000-022665 A | 1/2000 |
| JP | 2001-153963 A | 6/2001 |
| JP | 2001-326506 A | 11/2001 |
| JP | 2002-261514 A | 9/2002 |
| JP | 2002-265729 A | 9/2002 |
| JP | 2003-209511 A | 7/2003 |
| JP | 2004-505505 A | 2/2004 |
| JP | 2005-117153 A | 4/2005 |
| JP | 2008-022247 A | 1/2008 |

(56) References Cited

FOREIGN PATENT DOCUMENTS

| | | |
|---|---|---|
| JP | 2008-079241 | 4/2008 |
| JP | 2008-124917 A | 5/2008 |
| JP | 2008-129919 A | 6/2008 |
| JP | 2008-250713 A | 10/2008 |
| JP | 2008 252566 A | 10/2008 |
| JP | 2008252566 A | 10/2008 |
| JP | 2009-231114 | 7/2009 |
| JP | 2009-239842 A | 10/2009 |
| JP | 2010-183055 A | 8/2010 |
| JP | 2010-531035 A | 9/2010 |
| JP | 2011-022640 A | 2/2011 |
| JP | 2011-41078 A | 2/2011 |
| JP | 2011-044944 A | 3/2011 |
| JP | 2011-176672 A | 9/2011 |
| JP | 2014-516221 | 7/2014 |
| TW | 201249293 A1 | 12/2012 |
| WO | WO 97/32413 A | 9/1997 |
| WO | WO 2006/133108 A2 | 12/2006 |
| WO | WO 2009/113373 A1 | 9/2009 |
| WO | WO 2011/114737 A1 | 9/2011 |
| WO | WO 2011/114738 A1 | 9/2011 |
| WO | WO 2012/129426 A3 | 9/2012 |
| WO | 2012/154550 A1 | 11/2012 |
| WO | 2012/155135 A3 | 11/2012 |
| WO | WO 2012/154550 A1 | 11/2012 |
| WO | WO 2012/155135 A3 | 11/2012 |
| WO | WO 2012/166922 A1 | 12/2012 |
| WO | WO 2012/174350 A1 | 12/2012 |
| WO | 2013/006641 A3 | 1/2013 |
| WO | WO 2013/006641 A3 | 1/2013 |
| WO | WO 2013/040396 A1 | 3/2013 |
| WO | WO 2013/059801 A1 | 4/2013 |
| WO | WO 2013/059802 A1 | 4/2013 |
| WO | WO 2013/090625 A1 | 6/2013 |
| WO | WO 2013/131095 A1 | 9/2013 |
| WO | WO 2013/134444 A1 | 9/2013 |
| WO | 2014/026191 A1 | 2/2014 |
| WO | WO 2014/026191 A1 | 2/2014 |

OTHER PUBLICATIONS

"WirelessHD Specification version 1.1 Overview", www.wirelesshd.org, May 2010, 95 pages.

ECMA International, "Standard ECMA—398: Close Proximity Electric Induction Wireless Communications", Internet citation, Jun. 1, 2011, pp. 1-99.

Harald Gundlach, Authorized Officer, European Patent Office, "International Search Report" in connection with related PCT Patent Application No. PCT/US2013/075892, dated Apr. 23, 2014, 4 pages.

Harald Gundlach, Authorized Officer, European Patent Office, "Written Opinion of the International Searching Authority" in connection with related PCT Patent Application No. PCT/US2013/075892, dated Apr. 23, 2014, 8 pages.

Bluetooth Audio Dongle Receiver 3.5mm Stereo, Feb. 8, 2013.

Bluetooth Headset, Jabra clipper, Jul 28, 2010.

Chinese Office Action, Chinese Application No. 201280025060.8, Oct. 30, 2014, 8 pages (with concise explanation of relevance).

ECMA Standard: "Standard ECMA-398: Close Proximity Electric Induction Wireless Communications," Jun. 1, 2011, pp. 1-100, May be retrieved from the Internet<URL:http://www.ecma-international.org/publications/standards/Ecma-398.htm>.

Enumeration: How the Host Learns about Devices, Jan Axelson's Lakeview Research.

Future Technology Devices Interntional Limited (FTDI) "Technical Note TN_I 13 Simplified Description of USB Device Enumeration", Doc. Ref. No. FT_000180, Version 1.0, Issue Date Oct. 28, 2009, 19 pages.

Goldstone, L. L., "MM Wave Transmission Polarizer", International Symposium Digest—Antennas & Propagation vol. 2, Jun. 1979, 5 pages.

Japanese Office Action, Japanese Patent Office, "Notice of Reasons for Rejection" in connection with related Japanese Patent Application No. 2014-501249, dated Jul. 22, 2014, 7 pages.

Japanese Office Action, Japanese Application No. 2014-513697, Jan. 20, 2015, 7 pages.

Juntunen, E. A., "60 GHz CMOS Pico-Joule/Bit Oook Receiver Design for Multi-Gigabit Per Second Wireless Communications" thesis paper, Aug. 2008, 52 pages.

Korean Office Action, Korean Application No. 10-2013-7027865, Oct. 22, 2014, 12 pages.

Office of Engineering and Technology Federal Communications Commission, "Understanding the FCC Regulations for Low-Power, Non-Licensed Transmitters", OET Bulletin No. 63, Oct. 1993, 34 pages.

PCM510x 2VRMS DirectPath™, 112/106/IOOdB Audio Stereo DAC with 32-bit, 384kHz PCM Interface by Texas Instruments.

PCT International Search Report, PCT Patent Application No. PCT/US2013/027835, dated May 3, 2013, 4 pages.

PCT Written Opinion, PCT Patent Application No. PCT/US2013/027835, May 3, 2013, 8 pages.

PCT International Search Report, PCT Patent Application No. PCT/US2013/029469, Jun. 6, 2013, 5 pages.

PCT Written Opinion, PCT Patent Application No. PCT/US2013/029469, Jun. 6, 2013, 5 pages.

PCT International Search Report, PCT Patent Application No. PCT/US2013/023665, Jun. 20, 2013, 5 pages.

PCT Written Opinion, PCT Patent Application No. PCT/US2013/023665, Jun. 20, 2013, 10 pages.

PCT International Search Report, PCT Patent Application No. PCT/US2012/040214, Aug. 21, 2012, 3 pages.

PCT Written Opinion, PCT Patent Application No. PCT/US2012/040214, Aug. 21, 2012, 8 pages.

PCT International Search Report, PCT Patent Application No. PCT/US2012/042616, Oct. 1, 2012, 4 pages.

PCT Written Opinion, PCT Patent Application No. PCT/US2012/042616, Oct. 1, 2012, 10 pages.

PCT International Search Report, PCT Patent Application No. PCT/US2012/030166, Oct. 31, 2010, 6 pages.

PCT Written Opinion, PCT Patent Application No. PCT/US2012/030166, Oct. 31, 2010, 9 pages.

PCT International Search Report, PCT Patent Application No. PCT/US2012/055488, Dec. 13, 2012, 4 pages.

PCT Written Opinion, PCT Patent Application No. PCT/US2012/055488, Dec.13, 2012, 8 pages.

PCT International Search Report, PCT Patent Application No. PCT/US2012/045444, Jan. 21, 2013, 7 pages.

PCT Written Opinion, PCT Patent Application No. PCT/US2012/045444, Jan. 21, 2013, 9 pages.

PCT International Search Report, PCT Patent Application No. PCT/US2012/037795, Jan. 21, 2013, 7 pages.

PCT Written Opinion, PCT Patent Application No. PCT/US2012/037795, Jan. 21, 2013, 12 pages.

PCT International Search Report, PCT Patent Application No. PCT/US2012/061345, Jan. 24, 2013, 4 pages.

PCT Written Opinion, PCT Patent Application No. PCT/US2012/061345, Jan. 24, 2013, 7 pages.

PCT International Search Report, PCT Patent Application No. PCT/US2012/061346, Jan. 24, 2013, 5 pages.

PCT Written Opinion, PCT Patent Application No. PCT/US2012/061346, Jan. 24, 2013, 9 pages.

PCT International Search Report, PCT Patent Application No. PCT/US2012/069576, May 2, 2013, 3 pages.

PCT Written Opinion, PCT Patent Application No. PCT/US2012/069576, May 2, 2013, 13 pages.

PCT International Search Report, PCT Patent Application No. PCT/US2013/028896, Sep. 26, 2013, 4 pages.

PCT Written Opinion, PCT Patent Application No. PCT/US2013/028896, Sep. 26, 2013, 4 pages.

PCT International Search Report, PCT Patent Application No. PCT/US2013/046631, Sep. 20, 2013, 4 pages.

PCT Written Opinion, PCT Patent Application No. PCT/US2013/046631, Sep. 20, 2013, 6 pages.

(56) References Cited

OTHER PUBLICATIONS

PCT International Search Report, PCT Patent Application No. PCT/US2013/054292, Nov. 29, 2013, 4 pages.
PCT Written Opinion, PCT Patent Application No. PCT/US2013/054292, Nov. 29, 2013, 7 pages.
PCT International Search Report and Written Opinion, PCT Application No. PCT/US2014/024027, Jul. 21, 2014, 15 pages.
PCT International Search Report, PCT Application No. PCT/US2013/075222, Jul. 17, 2014, 4 pages.
PCT Written Opinion, PCT Application No. PCT/US2013/075222, Jul. 17, 2014, 8 pages.
PCT International Search Report, PCT Application No. PCT/US2013/075892, Apr. 23, 2014, 4 pages.
PCT Written Opinion, PCT Application No. PCT/US2013/075892, Apr. 23, 2014, 8 pages.
PCT International Search Report and Written Opinion, PCT Application No. PCT/US2013/033394, Aug. 8, 2013, 10 pages.
PCT International Search Report and Written Opinion, PCT Application No. PCT/US2013/055487, Jan. 24, 2014, 9 pages.
PCT International Search Report and Written Opinion, PCT Application No. PCT/US2013/076687, May 21, 2014, 20 pages.
PCT International Search Report and Written Opinion, PCT Application No. PCT/US2014/030115, Sep. 22, 2014, 15 pages.
PCT International Search Report and Written Opinion, PCT Application No. PCT/US2013/059811, Dec. 2, 2013, 11 pages.
Philips, I2S Bus Specification, Jun. 5, 1996.
RF Power Amplifier, Mar. 22, 2008, 1 page, May be Retrieved at <http://en.wikipedia.org/wiki/RF_power_amplifier>.
Silicon Labs USB-to-I2S Audio Bridge Chip Brings Plug-and-Play Simplicity to Audio Design, Cision Wire, Feb. 4, 2013.
TN21065L_I2S, Interfacing I2S-Compatible Audio Devices to the ADSP-21065L Serial Ports, Apr. 1999.
USB in a NutShell . . . (43 pages).
USB Made Simple, MQP Electronics Ltd, 2006-2008 (78 pages).
"Understanding the FCC Regulations for Low-Power Non-Licensed Transmitters", Office of Engineering and Technology, Federal Communications Commission, OET Bulletin No. 63, Oct. 1993.
Universal Serial Bus, Wikipedia, 2012 (32 pages).
Vahle Electrification Systems, "CPS Contactless Power System", Catalog No. 9d/E, 2004, 12 pages.
Wireless HD: "WirelessHD Specification Version 1.1 Overview," May 1, 2010, pp. 1-95, May be retrieved from the Internet<URL:http://www.wirelesshd.org/pdfs/WirelessHD-Specification-Overview-v1.1May2010.pdf>.
United States Office Action, U.S. Appl. No. 13/485,306, Sep. 26, 2013, 11 pages.
United States Office Action, U.S. Appl. No. 13/541,543, Feb. 12, 2015, 25 pages.
United States Office Action, U.S. Appl. No. 13/541,543, Oct. 28, 2014, 42 pages.
United States Office Action, U.S. Appl. No. 13/427,576, Oct. 30, 2014, 6 pages.
United States Office Action, U.S. Appl. No. 13/524,956, Feb. 9, 2015, 17 pages.
United States Office Action, U.S. Appl. No. 13/524,963, Mar. 17, 2014, 14 pages.
United States Office Action, U.S. Appl. No. 13/657,482, Jan. 2, 2015, 29 pages.
United States Office Action, U.S. Appl. No. 12/655,041, Jun. 7, 2013, 9 pages.
United States Office Action, U.S. Appl. No. 14/047,924, Dec. 19, 2014, 8 pages.
United States Office Action, U.S. Appl. No. 14/047,924, Feb. 27, 2014, 9 pages.
United States Office Action, U.S. Appl. No. 13/784,396, Sep. 11, 2014, 7 pages.
United States Office Action, U.S. Appl. No. 13/760,089, Jul. 7, 2014, 14 pages.
United States Office Action, U.S. Appl. No. 14/596,172, Feb. 10, 2015, 7 pages.
United States Office Action, U.S. Appl. No. 14/462,560, Feb. 13, 2015, 12 pages.
United States Office Action, U.S. Appl. No. 14/026,913, Feb. 25, 2015, 15 pages.
Chinese Second Office Action, Chinese Application No. 201280025060.8, Jun. 11, 2015, 8 pages.
Japanese Office Action, Japanese Application No. 2014-519270, Mar. 9, 2015, 17 pages.
Japanese Office Action, Japanese Application No. 2014-547442, May 25, 2015, 7 pages.
Korean Office Action, Korean Application No. 10-2013-7027865, Apr. 13, 2015, 8 pages.
Li, X. et al., "Space-Time Transmissions for Wireless Secret-Key Agreement with Information-Theoretic Secrecy," IEEE, 2003, pp. 1-5.
United States Office Action, U.S. Appl. No. 14/135,458, Apr. 13, 2015, 13 pages.
United States Office Action, U.S. Appl. No. 13/541,543, May 28, 2015, 17 pages.
United States Office Action, U.S. Appl. No. 14/047,924, May 21, 2015, 6 pages.
United States Office Action, U.S. Appl. No. 14/026,913, Jun. 5, 2015, 16 pages.
United States Office Action, U.S. Appl. No. 13/922,062, Jul. 23, 2015, 10 pages.
United States Office Action, U.S. Appl. No. 14/881,901, Dec. 17, 2015, 15 pages.
United States Office Action, U.S. Appl. No. 13/541,543, Dec. 21, 2015, 20 pages.
Japanese Office Action, Japanese Application No. 2015-004839, Aug. 10, 2015, 12 pages.
United States Office Action, U.S. Appl. No. 13/963,199, Jul. 27, 2015, 9 pages.
Chinese First Office Action, Chinese Application 201280043190.4, Jan. 21, 2015, 18 pages.
Chinese Second Office Action, Chinese Application 201280043190.4, Oct. 26, 2015, 5 pages.
European Examination Report, European Application No. 13711499.7, Oct. 5, 2015, 8 pages.
Japanese Office Action, Japanese Application No. 2014-513697, Nov. 2, 2015, 5 pages.
United States Office Action, U.S. Appl. No. 14/026,913, Sep. 18, 2015, 9 pages.
United States Office Action, U.S. Appl. No. 13/657,482, Sep. 22, 2015, 24 pages.
United States Office Action, U.S. Appl. No. 14/215,069, Oct. 30, 2015, 15 pages.
United States Office Action, U.S. Appl. No. 14/047,924, Nov. 18, 2015, 7 pages.
Chinese First Office Action, Chinese Application No. 201280038180.1, Dec. 1, 2015, 16 pages.
Chinese Third Office Action, Chinese Application No. 201280025060.8, Dec. 28, 2015, 6 pages.
Chinese First Office Action, Chinese Application No. 201280062118.6, Jan. 5, 2016, 15 pages.
Chinese First Office Action, Chinese Application No. 201380055859.6, Jan. 20, 2016, 5 pages.
Chinese First Office Action, Chinese Application No. 201380048407.5, Feb. 3, 2016, 14 pages.
European Examination Report, European Application No. 13821032.3, Apr. 4, 2016, 3 pages.
Ingerski, J., "Mobile Tactical Communications, The Role of the UHF Follow-On Satellite Constellation and Its Successor, Mobile User Objective System," IEEE, 2002, pp. 302-306.
Japanese Office Action, Japanese Application No. 2014/547442, Mar. 14, 2016, 8 pages.
Taiwan Office Action, Taiwan Application No. 101110057, Mar. 23, 2016, 7 pages.
Taiwan Office Action, Taiwan Application No. 101147406, Mar. 23, 2016, 6 pages.
United States Office Action, U.S. Appl. No. 14/936,877, Mar. 23, 2016, 15 pages.

(56) References Cited

OTHER PUBLICATIONS

Chinese First Office Action, Chinese Application No. 201380023102.9, Jun. 14, 2016, 13 pages. (with concise explanation of relevance).
Chinese Fourth Office Action, Chinese Application No. 201280025060.8, Jun. 17, 2016, 5 pages. (with concise explanation of relevance).
European Communication Under Rule 164(2)(a) EPC, European Application No. 14726242.2, Jul. 11, 2016, 3 pages.
Japanese Office Action, Japanese Application No. 2015-004839, May 16, 2016, 10 pages.
Taiwan Office Action, Taiwan Application No. 101119491, May 9, 2016, 9 pages.
Taiwan Office Action, Taiwan Application No. 101138870, Jun. 13, 2016, 8 pages.
United States Office Action, U.S. Appl. No. 14/106,765, Jun. 9, 2016, 10 pages.
United States Office Action, U.S. Appl. No. 13/963,199, Jun. 1, 2016, 8 pages.
United States Office Action, U.S. Appl. No. 15/144,756, Jun. 16, 2016, 12 pages.
Chinese First Office Action, Chinese Application No. 201380071296.X, Sep. 2, 2016, 24 pages (with concise explanation of relevance).

* cited by examiner

MODULAR ELECTRONICS

CROSS-REFERENCES TO RELATED APPLICATION

The present application claims the benefit under 35 U.S.C. §119(e) of the filing date of U.S. Provisional Patent Application Ser. No. 61/738,297 for MODULAR ELECTRONICS, filed Dec. 17, 2012, which is hereby incorporated by reference in its entirety for all purposes.

In addition, U.S. patent application Ser. Nos. 13/427,576; 13/471,052; 13/618,138; 13/657,476; 13/713,564; and 13/963,199 are also incorporated by reference in their entirety for all purposes.

TECHNICAL FIELD

The disclosure relates to data transfer using extremely high frequency (EHF) communication devices. More particularly, the disclosure relates to supplementing functional components of a first device by a second device using EHF communication.

BACKGROUND

Advances in semiconductor manufacturing and circuit design technologies have enabled the development and production of integrated circuits (ICs) with increasingly higher operational frequencies. In turn, electronic products and systems incorporating such integrated circuits are able to provide much greater functionality than previous generations of products. This additional functionality has generally included the processing of increasingly larger amounts of data at increasingly higher speeds.

Many electronic systems include multiple printed circuit boards (PCBs) upon which these high-speed ICs are mounted, and through which various signals are routed to and from the ICs. In electronic systems with at least two PCBs and the need to communicate information between those PCBs, a variety of connector and backplane architectures have been developed to facilitate information flow between the boards. Unfortunately, such connector and backplane architectures introduce a variety of impedance discontinuities into the signal path, resulting in a degradation of signal quality or integrity. Connecting to boards by conventional means, such as signal-carrying mechanical connectors, generally creates discontinuities, requiring expensive electronics to negotiate. Conventional mechanical connectors may also wear out over time, require precise alignment and manufacturing methods, and are susceptible to mechanical jostling. Finally, conventional mechanical connectors are bulky in comparison to other components typically found mounted on a PCB or otherwise within an apparatus such as a portable electronic device, thus adding significant bulk to the overall dimensions of the device. This is true when the mechanical connector is between two internal circuits, and especially true when the mechanical connector is configured to allow connection between two devices.

BRIEF SUMMARY

In a first example, a method of configuring an electronic device is provided. The electronic device may comprise first and second electronics modules. The first electronics module may include a first operative component that is electrically connected to a first communication unit. The first communication unit may include a transducer configured to transmit and/or receive an extremely high frequency (EHF) electromagnetic signal, and to convert between electrical signals and electromagnetic signals. The first communication unit may include an integrated circuit including at least one of a transmitter circuit and a receiver circuit that is operatively coupled to the transducer. The second electronics module may include a second operative component that is electrically connected to a second communication unit. The second communication unit may include a transducer configured to transmit and/or receive an EHF electromagnetic signal, and to convert between electrical signals and electromagnetic signals. The second communication unit may include a second integrated circuit including at least one of a transmitter circuit and a receiver circuit that is operatively coupled to the transducer. The method may comprise orienting respective faces of the first and second electronics modules relative to one another, attaching the first electronics module to the second electronics module with the respective faces opposing each other, and establishing an EHF communication link between the first and second communication units through the opposing faces of the first and second electronics modules.

In a second example, a modular electronics system is provided. The modular electronics system may include a first electronics module having a first operative component electrically connected to a first communication unit. The first communication unit may include a transducer configured to transmit and/or receive an Extremely High Frequency (EHF) electromagnetic signal, and to convert between electrical signals and electromagnetic signals. The modular electronics system may include an integrated circuit having at least one of a transmitter circuit and a receiver circuit operatively coupled to the transducer. The modular electronics system may include a second electronics module having a second operative component electrically connected to a second communication unit. The second communication unit may include a transducer configured to transmit and/or receive an EHF electromagnetic signal, and to convert between electrical signals and electromagnetic signals. The second communication unit may include a second integrated circuit having at least one of a transmitter circuit and a receiver circuit operatively coupled to the transducer. A major face of the first electronics module may be configured to contact a major face of the second electronics module and form an EHF communication link between the first communication unit and the second communication unit.

In a third example, a modular electronics system may include a first electronics module including a printed circuit board assembly. The printed circuit board assembly may include a first printed circuit board (PCB) having a first major surface and an opposed (or opposite) second major surface. The PCB may define an aperture. A bi-directional integrated circuit (IC) package may be mounted to the printed circuit board and configured to generate EHF band signals. The bi-directional integrated circuit package may be disposed such that the EHF band signals generated by the bi-directional IC propagate in a first direction normal to the first major surface of the first PCB, and in a second direction normal to the second major surface of the PCB and away from the first direction through the aperture defined by the first PCB.

In a fourth example, a modular electronics system may include a plurality of electronics modules. At least two modules of the plurality of electronics modules may be encapsulated in respective enclosures, and include respective operative components electrically connected to respective EHF communication units. Each of the respective EHF communication units may include a transducer configured to at least transmit and/or receive an EHF electromagnetic signal, and to convert between electrical signals and electromagnetic signals. Each of the EHF communication unit may include an integrated circuit having at least a transmitter circuit and a receiver circuit that is operatively coupled to the transducer. A magnet may be disposed in at least one of the enclosures such that a magnetic interaction may releasably couple together the at least two modules to hold the respective transducers in proximity to one another to enable an EHF communication link between the respective EHF communication units.

In a fifth example, a computing device may include an integrated unit having a plurality of functional components and an EHF communication unit operatively coupled to the integrated unit. The EHF communication unit may include a transducer configured to transmit and receive EHF electromagnetic signals, and to convert between electrical signals and electromagnetic signals. The computing device may include a transceiver operatively coupled to the transducer. The EHF communication unit may enable at least one of the functional components of the computing device to be supplemented by a functional component of an external computing device.

In a sixth example, a computing device may include a first electronics module. The first electronics module may include a first EHF communication unit, and a first integrated unit having a first plurality of functional processing components. The computing device may further include a second electronics module. The second electronics module may include a second EHF communication unit, and a second integrated unit having a second plurality of functional processing components. The first electronics module and the second electronics module may be disposable within an appropriate relative proximity and relative orientation to permit an EHF communication link between the first and second EHF communication units to permit sharing of at least one of the functional processing components of the second plurality of functional processing components with at least one of the functional processing components of the first plurality of functional processing components.

Figure 1:
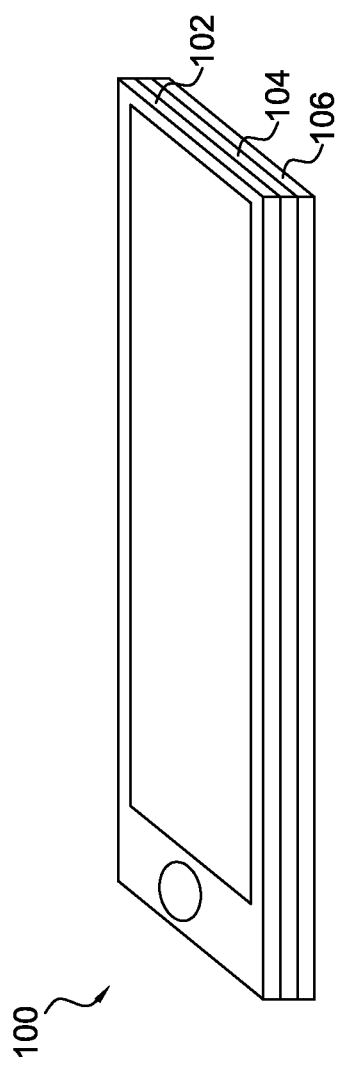
FIG. 1 is a schematic isometric view of an electronic device including a first electronics module, a second electronics module, and a power module, according to the present disclosure.

Those with ordinary skill in the art will appreciate that the elements in the drawings are illustrated for simplicity and clarity and are not necessarily drawn to scale. For example, the dimensions of some of the elements in the drawings may be exaggerated, relative to other elements, in order to improve the understanding of the disclosure.

There may be additional structures described in the description that are not depicted in the drawings, and the absence of such a drawing should not be considered as an omission of such design from the specification.

DETAILED DESCRIPTION

Before describing embodiments of the present disclosure in detail, it should be observed that the present embodiments of the present disclosure may utilize apparatus components and method steps related to electronic devices capable of EHF communication. Accordingly, the apparatus components have been represented where appropriate by conventional symbols in the drawings, showing specific details that are pertinent for an understanding of the present disclosure so as not to obscure the disclosure with details that will be readily apparent to those with ordinary skill in the art having the benefit of the description herein.

Detailed embodiments are disclosed herein; however, it is to be understood that the disclosed embodiments are merely exemplary of the claimed elements, which can be embodied in various forms. Therefore, specific structural and functional details disclosed herein are not to be interpreted as limiting, but merely as a basis for the claims and as a representative basis for teaching one skilled in the art to variously employ the disclosed concepts in an appropriate structure. Further, the terms and phrases used herein are not intended to be limiting but rather to provide an understandable description of the subject matter.

Furthermore, in today's society and computing environment, electronic devices are being used increasingly. Methods and apparatus using EHF communication may provide secure, stable, and high-bandwidth communication between and within these devices.

An example of an EHF communications unit is an EHF comm-link chip. Throughout this disclosure, the terms comm-link chip, comm-link chip package, and EHF communication link chip package will be used to refer to EHF antennas embedded in IC packages. Examples of such comm-link chips are described in detail in U.S. Provisional Patent Application Ser. Nos. 61/491,811, 61/467,334, 61/485,543, and 61/535,277, all of which are hereby incorporated in their entireties for all purposes. Comm-link chips are an example of a communication device, also referred to as communication unit, whether or not they provide wireless communication and whether or not they operate in the EHF frequency band.

Wireless communication may be used to provide signal communications between components or modules in a device or may provide communication between devices. Wireless communication provides an interface that is not subject to mechanical and electrical degradation. Examples of systems employing wireless communication between chips are disclosed in U.S. Pat. No. 5,621,913 and U.S. Pat. No. 8,554,136, the disclosures of which are incorporated herein by reference in their entirety for all purposes.

In one example, tightly-coupled transmitter/receiver pairs may be deployed with a transmitter disposed at a terminal portion of a first conduction path and a receiver disposed at a terminal portion of a second conduction path. The transmitter and receiver may be disposed in close proximity to each other depending on the strength of the transmitted energy, and the first conduction path and the second conduction path may be discontinuous with respect to each other. In exemplary versions, the transmitter and receiver may be disposed on separate circuit carriers positioned with the antennas of the transmitter/receiver pair in close proximity.

A transmitter or receiver may be configured as an IC package, in which an antenna may be positioned adjacent to a die and held in place by a dielectric or insulating encapsulation or bond material. A transmitter or receiver may be configured as an IC package, in which an antenna may be positioned adjacent to a die and held in place by encapsulation material of the package and/or a lead frame substrate.

These IC packages, along with contactless power transfer methods, may be used to create modular components for electronic devices. Because modules can thus transfer data and power without contacts, each module may be self-contained, and may be environment-proofed. Modules may be assembled and disassembled with ease, even by hand, as no complicated and/or easily-damaged connectors are used in assembly. The modules may be configured with magnets or clips to connect to each other in one or more configurations. In this fashion, modules may be field-swapped to repair or upgrade, and complicated final assembly steps may be eliminated. Customization by the user may be facilitated. By using the short-range EHF IC packages to provide communication, relaxed module alignment requirements may be facilitated due to the relatively tolerant EHF coupling characteristics of the IC packages. Exposed metal may be eliminated as well, resulting in better wear characteristics and enabling capabilities such as waterproofing.

An operative component may refer to one or more of the following: a processor, a controller, a logic component, sensor interface, a non-volatile memory, a volatile memory, a display, user interface(s) and/or a touchpad, among others.

FIG. 1 shows a schematic isometric view of an electronic device 100. Electronic device 100 may be made up of multiple layers or modules. The multiple layers or modules may include a first electronics module 102, a second electronics module 104, and a third (or power) module 106. For example, first electronics module 102 may be a display module, and second electronics module 104 may be a processing module.

Figure 2A:
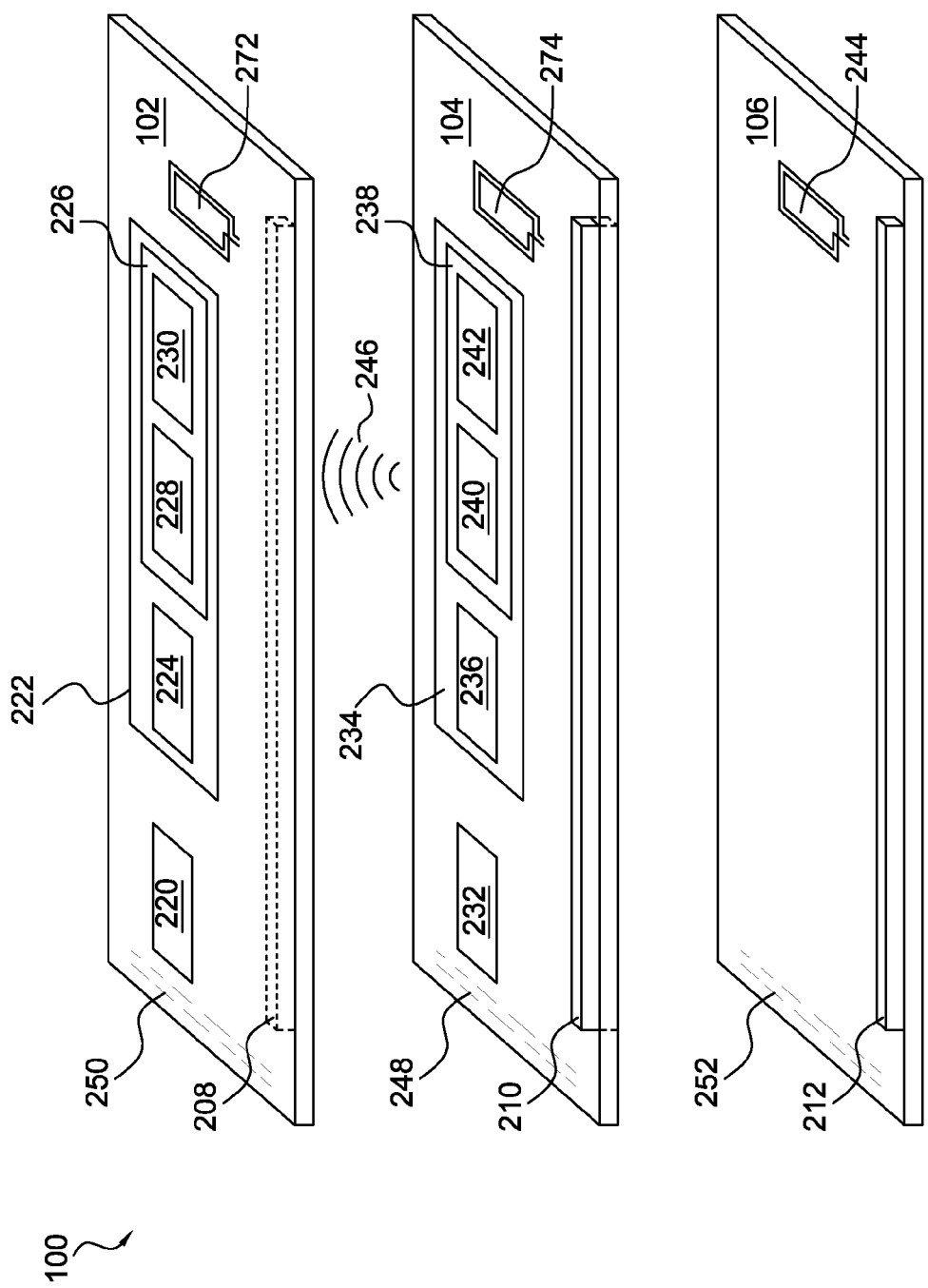
FIG. 2A is an exploded view of the electronic device of FIG. 1.

FIG. 2A shows an exploded view of electronic device 100 of FIG. 1. As shown in FIG. 2A, first electronics module 102 may include a first operative component 220. First operative component 220 may be electrically connected to a first communication unit 222. First communication unit 222 may include a transducer 224 and an integrated circuit 226. Transducer 224 may be configured to transmit and/or receive EHF electromagnetic signals and to convert between electrical signals and electromagnetic signals. Integrated circuit 226 may include a transmitter circuit 228 and a receiver circuit 230. Transmitter circuit 228 and receiver circuit 230 may be operatively coupled to transducer 224.

Second electronics module 104 may include a second operative component 232. Second operative component 232 may be electrically connected to a second communication unit 234. Second communication unit 234 may include a transducer 236 and an integrated circuit 238. Transducer 238 may be configured to transmit and/or receive the EHF electromagnetic signals and to convert between electrical signals and electromagnetic signals. Integrated circuit 238 may include a transmitter circuit 240 and a receiver circuit 242. Transmitter circuit 240 and receiver circuit 242 may be operatively coupled to transducer 238. First operative component 220 may include one or more components such as a processor, a non-volatile memory, a volatile memory, a display, and/or a touchpad, among others. Second operative component 232 may include one of more components such as a processor, a non-volatile memory, a volatile memory, a display, and/or a touchpad, among others.

Third module 106 may include a third operative component. For example, third module 106 may be a power module, and the third operative component may be a power supply (or an inductive coil 244 of the power supply). The power supply may be configured to supply power to first electronics module 102 and/or to second electronics module 104. For example, first electronics module 102 and second electronics module 104 may be configured to receive power from power module 106 via an inductive power transmission through inductive coil 244 of power module 106. For example, inductive coil 244 may be configured to inductively transmit power (from the power supply of power module 106) to a first inductive coil 272 (e.g., which may be configured to receive the inductive power transmission) of first electronics module 102 and/or to a second inductive coil 274 (e.g., which may be configured to receive the inductive power transmission) of second electronics module 274.

Power module 106 may be rechargeable using a contactless power source such as an inductive or capacitive power source, and may inductively transmit power to one or more modules via inductive coil 224. In some embodiments, power may be transferred contactlessly from power module 106 to each of first electronics module 102 and second electronics module 104. In some embodiments, power module 106 may include standard power contacts for transferring electrical power between modules. In some embodiments, power module 106 may include one or more operative components, such as a processor, a non-volatile memory, a volatile memory, a display, and/or a touchpad.

In some embodiments, either of first and second modules 102 and 104 may include a power supply (or self-powered supply), in which case electronics device 100 may not include a separate power supply. For example, first electronics module 102 and/or second electronics module 104 may include a power supply and may be configured to transfer power (e.g., via inductive transmission, or via contacts) to another module. For example, first electronics module 102 may include a first power supply configured to power first electronics module independently from an interface (e.g., an inductive interface, or an interface of electrical contacts) between first and second electronics modules 102 and 104.

In some embodiments, the first power supply may be configured to power the second electronics module (e.g., through an interface between first and second electronics modules 102 and 104). For example, first inductive coil 272 may be configured to inductively transmit power from the first power supply to second inductive coil 274. In other embodiments, first and second electronics modules 102 and 104 may include electrical contacts that interface with one another when first and second electronics modules are attached (or brought into contact with one another), and the first power supply may be configured to transmit power to the second electronics module via the electrical contacts.

In some embodiments, power module 106 may include one or more components similar to first and/or second electronics modules 102 and 104. For example, power module 106 may include one or more operative components electrically connected to an EHF communication unit.

First electronics module 102, second electronics module 104, and power module 106 may be stacked atop each other to form electronic device 100. In a configuration of electronic device 100, first electronics module 102 may be attached (e.g., releasably or non-releasably) to second electronics module 104 and second electronics module 104 may be attached (e.g., releasably or non-releasably) to power module 106. Attachment of first electronics module 102, second electronics module 104 and/or power module 106 to one another may form an EHF communication link 246 between first communication unit 222 and second communication unit 234.

In some embodiments, respective faces of first and second electronics modules 102 and 104 may be oriented relative to one another (e.g., as shown in FIG. 2A). First electronics module 102 may then be attached (e.g., by an attachment structure or device) to second electronics module 104 with the respective faces opposing each other (see FIG. 1). EHF communication link 246 (see FIG. 2A) may be established between first and second communication units 222 and 234 through the opposing faces. In other embodiments, first and second electronics modules 102 and 104 may be attached to one another before first and second electronics modules 102 and 104 are oriented relative to one another, and orienting first and second electronics modules 102 and 104 relative to one another may establish EHF communication link 246.

A suitable attachment structure may include any suitable structure, apparatus, device, and/or mechanism configured to attach first electronics module 102 to second electronics module 104 (or vice versa), and/or first and/or second electronics modules 102 and 104 to third module 106. For example, the attachment structure, may include a mechanical registration feature (e.g., a flange), a twist-lock mechanism, one or more sleeves, one or more compartments, one or more bolts, screws, or other fasteners, or any suitable combination thereof.

In some embodiments, first operative component 220 may include a user interface component. An operative connection may be formed between the user interface component and second operative component 232 when first electronics module 102 is attached directly or indirectly to second electronics module 104. During operation of device 100, data can be transmitted between first electronics module 102 and second electronics module 104 by a coupling of transmitter circuit 228 and receiver circuit 230 with transmitter circuit 240 and receiver circuit 242 when EHF communication link 246 is established. The coupling of transmitter circuit 228 and receiver circuit 230 with transmitter circuit 240 and receiver circuit 242 may provide a contactless data pathway, conduit, or channel.

In some embodiments, first electronics module 102 may include a magnetically responsive element 208, second electronics module 104 may include a magnet 210, and the power module 106 may include a magnetically responsive element 212. Magnetically responsive elements are elements that are themselves magnetic or that are attracted to a magnet, such as a ferromagnetic element. Attaching first electronics module 102, second electronics module 104, and power module 106 may include positioning each of the modules so that magnet 210 is attractively coupled to magnetically responsive elements 208 and 212.

It may be noted that second electronics module 104 is shown including magnet 210, and that first electronics module 102 and power module 106 are shown including magnetically responsive elements 208 and 212; however, embodiments may include other combinations. For example, at least one of first electronic module 102, second electronics module 104, and power module 106 may include at least one magnet, and at least one other of the electronics modules and the power module 106 may include a magnetically responsive element.

In some embodiments, magnet 210, magnetically responsive element 208, and/or magnetically responsive element 212 may be embedded along respective elongate edges of second electronics module 104, first electronics module 102, and power module 106. In some embodiments, magnetically responsive elements and/or magnets may be embedded along opposite edges of one or more of the modules. In some embodiments, magnet 210 and magnetically responsive elements 208 and 212 can be embedded along shorter edges of the respective modules (e.g., in respective regions indicated at 248, 250 and 252). In some embodiments, one or more modules may include one or more mechanical registration features or other attachment features (e.g., adhesives, mechanical structures, bolts, among others).

Figure 2B:
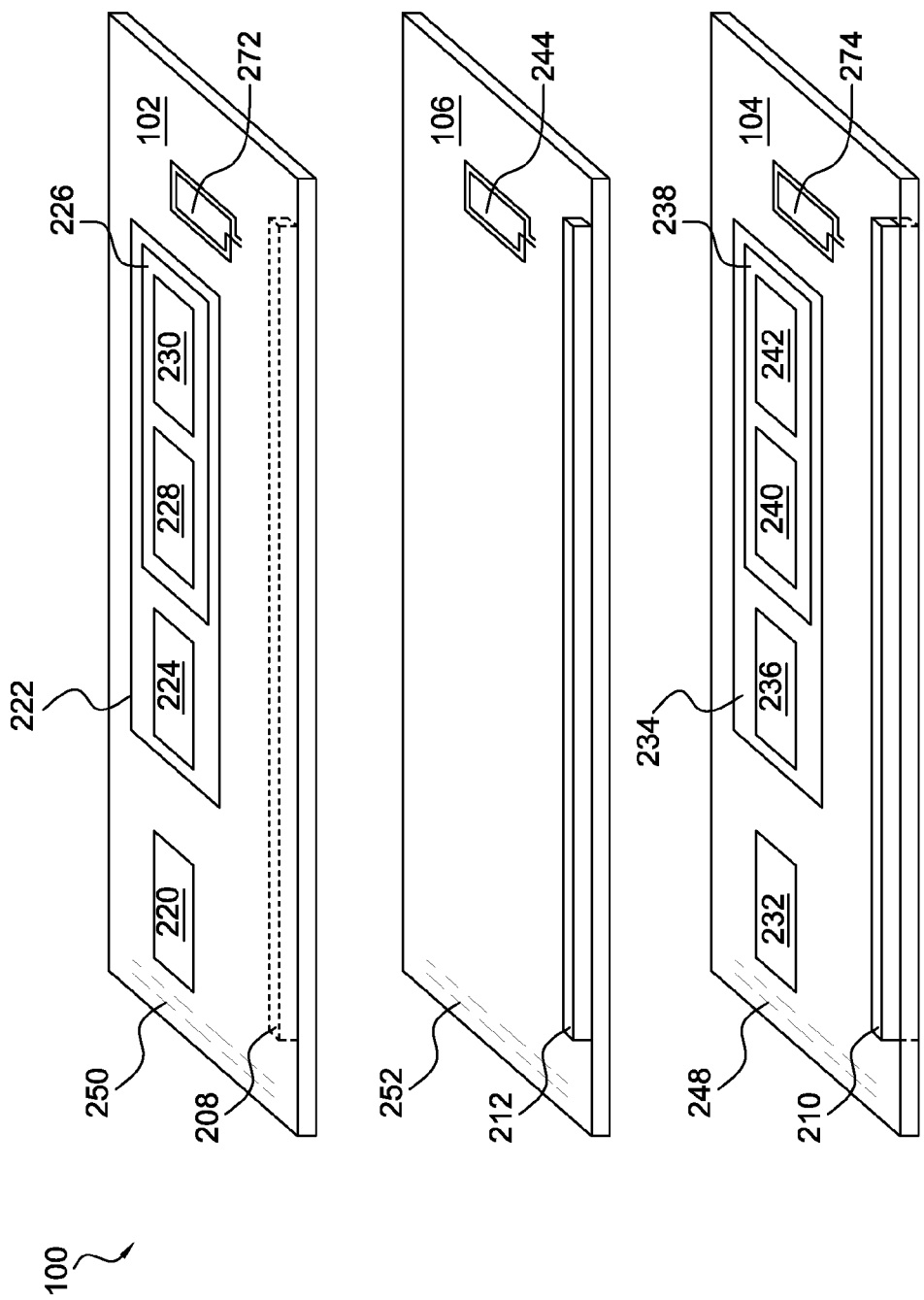
FIG. 2B is an exploded view of another configuration of the electronic device of FIG. 1.

In some embodiments, as shown in FIG. 2B, power module 106 may be disposed between first electronics module 102 and second electronics module 104 to configure electronic device 100. In some embodiments, electronic device 100 may be formed by using other configurations of first electronics module 102, second electronics module 104 and power module 106.

Figure 3:
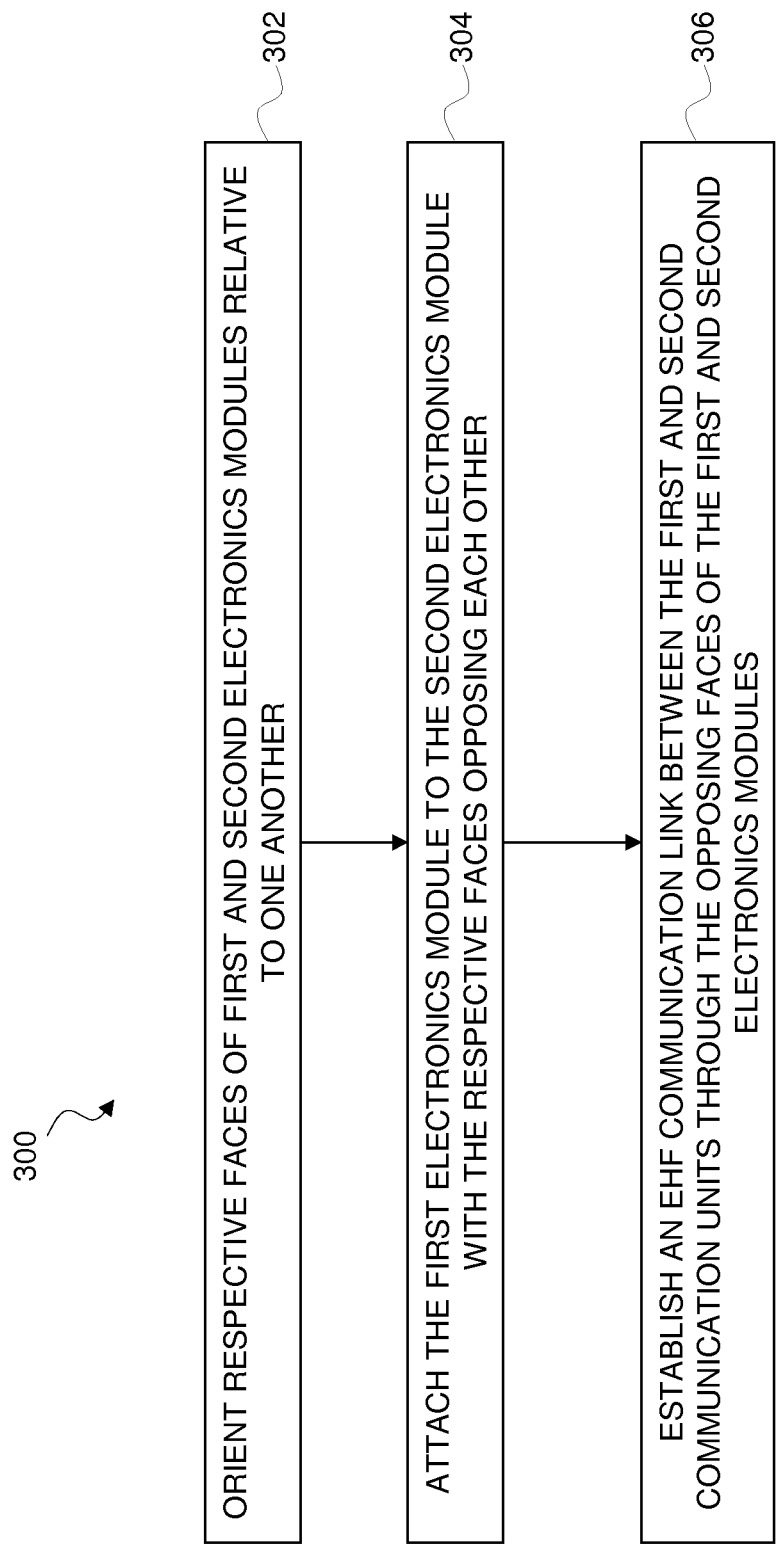
FIG. 3 is a flow chart depicting a method for configuring an electronic device, according to the present disclosure.

FIG. 3 depicts a method 300 for configuring an electronic device. The electronic device may comprise first and second electronics modules. The first electronics module may include a first operative component that is electrically connected to a first communication unit. The first communication unit may include a transducer configured to transmit and/or receive an extremely high frequency (EHF) electromagnetic signal, and to convert between electrical signals and electromagnetic signals. The first communication unit may include an integrated circuit including at least one of a transmitter circuit and a receiver circuit that is operatively coupled to the transducer. The second electronics module may include a second operative component that is electrically connected to a second communication unit. The second communication unit may include a transducer configured to transmit and/or receive an EHF electromagnetic signal, and to convert between electrical signals and electromagnetic signals. The second communication unit may include a second integrated circuit including at least one of a transmitter circuit and a receiver circuit that is operatively coupled to the transducer.

Method 300 may include a step 302 of orienting respective faces of the first and second electronics modules relative to one another. For example, step 302 may involve aligning respective communication units and/or associated waveguides of the first and second electronics modules.

Method 300 may include a step 304 of attaching the first electronics module to the second electronics module with the respective faces opposing each other.

In some embodiments, step 304 may involve releasably attaching the first electronics module to the second electronics module. In other embodiments, step 304 may involve non-releasably or permanently attaching the first electronics module to the second electronics module.

In some embodiments, step 304 may involve directly attaching the first electronics module to the second electronics module. For example, step 304 may involve contacting an enclosure of the first electronics module with an enclosure of the second electronics module.

In other embodiments, step 304 may involve indirectly attaching the first electronics module to the second electronics module. For example, step 304 may involve attaching one the first and second electronics modules to a third module, and then attaching the other of the first and second electronics modules to the third module.

Method 300 may include a step 306 of establishing an EHF communication link between the first and second communication units through the opposing faces of the first and second electronics modules.

In some embodiments, the first electronics module may include a first power supply configured to power the first electronics module independent from an interface between the first and second electronics modules.

Method 300 may further comprise a step of powering the second electronics module by the first power supply (of the first electronics device) through the interface between the first and second electronics modules. In some embodiments, powering the second electronics module may involve inductively transmitting power from the first electronics module to the second electronics module. In other embodiments, powering the second electronics module may involve transmitting power from the first electronics module to the second electronics module via interfaced electrical contacts of the first and second electronics modules.

Method 300 may further comprise attaching a third module to at least one of the first and second electronics modules. The third module may include a third operative component. The third module may be a power module, and the third operative component may be a power supply configured to supply power for the first and second electronics modules when coupled either directly or indirectly to the first and second electronics modules.

In some embodiments, method 300 may include a step of attaching one of the first electronics module, the second electronics module, and the power module to another of the first electronics module, second electronics module, and power module to form a module complex.

In some embodiments, method 300 may include a step of attaching the remaining one of the first electronics module, the second electronics module and the power module to the module complex.

In method 300, attaching the first electronics module, second electronics module and power module to one another may form an EHF communication link between the first and second communication units through opposing faces of the first and second modules. An operative combination of the first electronics module, the second electronics module, and the power module may create a corresponding electronic device.

In some embodiments, the first operative component may include a user interface component, such that attaching the first electronics module directly or indirectly to the second electronics module forms an operative connection between the user interface component and the second operative component.

In some embodiments, at least one of the electronics modules and power module may further comprise at least one magnet, and at least another of the electronics modules and power module may further comprise a magnetically responsive element, such that releasably attaching the electronics modules and/or power module includes positioning the modules so that the magnet is attractively coupled to the magnetically responsive element. The magnetically responsive element may be a second magnet.

In some embodiments, at least one of the electronics modules and/or power module may include a mechanical registration feature or attachment structure (e.g., a flange, a twist-lock mechanism, one or more sleeves, one or more compartments, and/or one or more bolts) for attaching the modules together. For example, at least one of the electronics modules and/or power module may be a flanged module that further comprises a flange extending from at least one edge of the flanged module, and attaching the flanged module to another of the modules may include creating a frictional fit between an edge of the another module and an internal surface of the flange of the flanged module.

In some embodiments, one or more of the electronic modules and/or power module may be attached using one or more of magnets and magnetically responsive elements, adhesive material(s), and enclosures that fit into each other.

In some embodiments, configuring the electronic device may comprise attaching the first electronics module to the second electronics module, and then attaching the power module to one of the first and second electronics modules.

In some embodiments, the power module may be disposed between the first electronics module and the second electronics module such that a first face, such as a major face, of the power module contacts a face of the first electronics module and a second face of the power module contacts a face of the second electronics module.

A major face of a module may be defined as a face of the module that is not the smallest face of the module. For example, the module may have first, second, and third faces. The first face may be the smallest face, the third face may be larger than the second face, and the second face may be a major face of the module.

In some embodiments, the first electronics module and the second electronics module may be configured to receive power from the power module via inductive power transmission.

In some embodiments, at least one face, such as a major face, of each of the first electronics module, the second electronics module, and the power module may contact a face, such as a major face, of another of the first electronics module, the second electronics module, and the power module.

In some embodiments, the first electronics module may further comprise a first dielectric surface or component (e.g., a waveguide) extending between the transducer of the first communication unit and a first exterior surface of the first electronics module for conducting the EHF electromagnetic signal between the transducer of the first communication unit and the first exterior surface. The second electronics module may further comprise a second dielectric surface or component (e.g., a waveguide) extending between the transducer of the second communication unit and a second exterior surface of the second electronics module for conducting the EHF electromagnetic signal between the transducer of the second communication unit and the second exterior surface. When the first electronics module is attached to the second electronics module, the first dielectric surface or component may align with the second dielectric surface or component for conducting the EHF electromagnetic signal between the transducer of the first communication unit and the transducer of the second communication unit.

In some embodiments, attaching one of the first electronics module, the second electronics module, and the power module to another of the first electronics module, second electronics module, and power module to form the module complex may comprise releasably attaching one of the first electronics module, the second electronics module, and the power module to another of the first electronics module, second electronics module, and power module to form the module complex; and attaching the remaining one of the first electronics module, the second electronics module and the power module to the module complex may comprise releasably attaching the remaining one of the first electronics module, the second electronics module and the power module to the module complex. In other embodiments, one or more of the modules may be non-releasably attached to at least one of the other modules.

Figure 4:
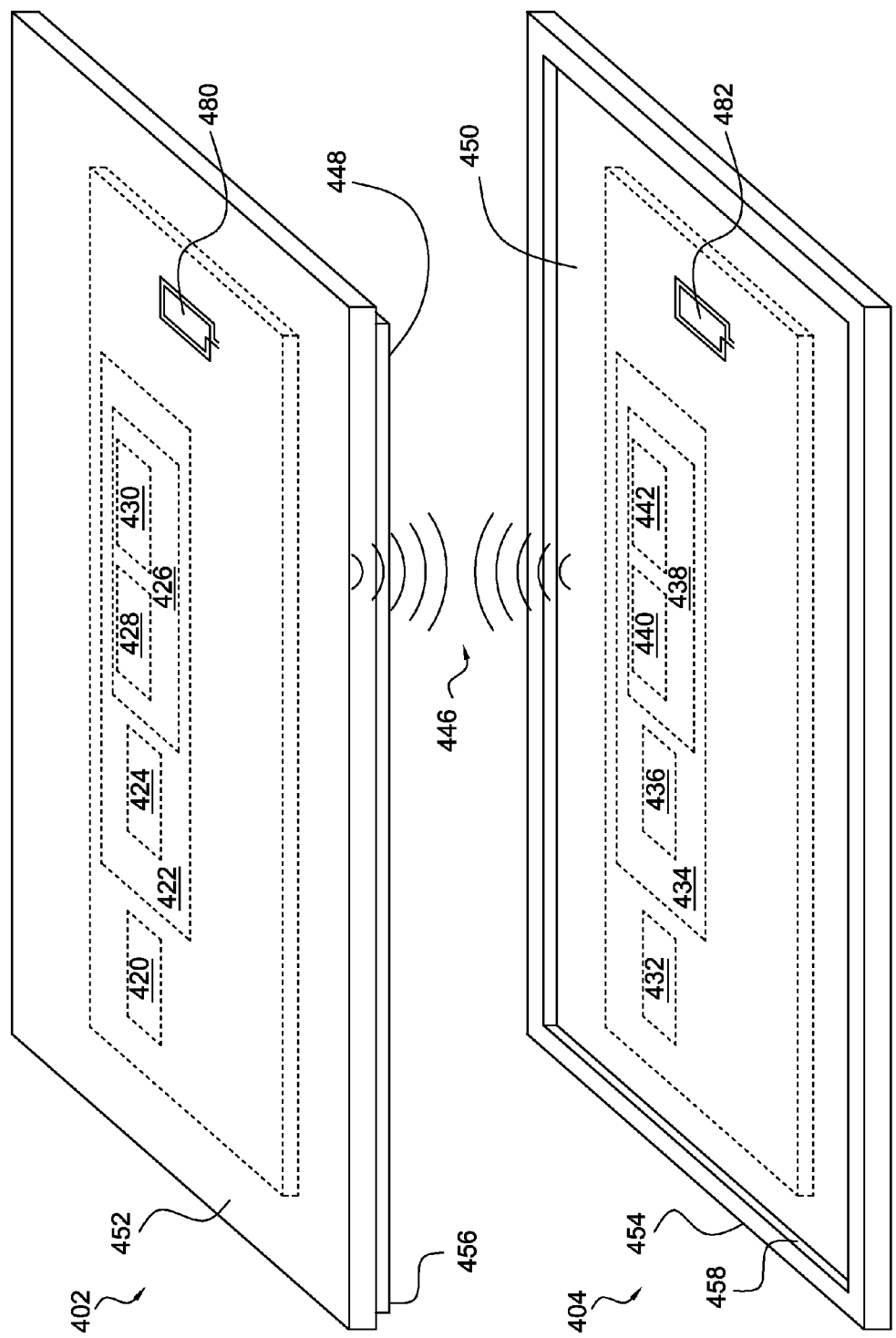
FIG. 4 is an exploded view of a flanged module configuration.

FIG. 4 is an exploded view showing various surfaces of a first electronics module 402 and a second electronics module 404. First electronics module 402 may be similar to first electronics module 102 (and vice versa), and second electronics module 404 may be similar to second electronics module 104 (and vice versa). A major face 448 of first electronics module 402 may be configured to contact a major face 450 of second electronics module 404 to form an EHF communication link 446 between a first communication unit 422 and a second communication unit 434. As shown in FIG. 4, faces 448 and 450 are respective faces of first and second electronics modules that oppose each other. First communication unit 422 may be similar to first communication unit 222 of FIG. 2A, and second communication unit 434 may be similar to second communication unit 234 of FIG. 2A. In some embodiments, major face 448 of first electronics module 402 may correspond to a surface on which a first operative components 420 and first communication unit 422 may be positioned, and major face 450 of second electronics module 404 may correspond to a surface on which second operative component 432 and second communication unit 434 may be positioned. In other embodiments, major surface 448 may correspond to a major surface of an enclosure of first electronics module 402, and major surface 450 may correspond to a major surface of an enclosure of second electronics module 404.

As shown in FIG. 4, first electronics module 402 may include a first enclosure 452. First enclosure 452 may enclose first operative component 420 and first communication unit 422. Second electronics module 404 may include a second enclosure 454. Second enclosure 454 may enclose second operative component 432 and second communication unit 434. Major face 448 of first electronics module 402 may be a major face of first enclosure 452, and major face 450 of second electronics module 404 may be a major face of second enclosure 454. First enclosure 452 and second enclosure 454 may be any suitable structure configured to enclose the respective first electronics module and the second electronics module. The enclosures may provide protection from the environment as well as suitable mechanical interface surfaces for other such modules. First enclosure 452 and second enclosure 454 may be configured to allow EHF signals and/or inductively-coupled or capacitive-coupled power to pass there through, enabling contact-less communication and recharging. For example, first enclosure 452 and second enclosure 454 may each be a case made of plastic or other dielectric material. In some embodiments, one or more dielectric structures may be included in one or more of the enclosures. The one or more dielectric structures may include one or more lensing elements. In some embodiments, first enclosure 452 and second enclosure 454 may be solid encapsulations, such as an epoxy. In some embodiments, first enclosure 452 and second enclosure 454 may include multiple different materials, such as a metal case having dielectric-filled openings. Similarly, a power module (similar to the power module 106 shown in FIG. 2) may have an enclosure which encapsulates the power module.

First electronics module 402 may be described as a first flange (or flanged) module having a flange 456. Flange 456 may be attached to at least one edge of first enclosure 452. Similarly, second electronics module 404 may be described as a second flange (or flanged) module having a flange 458. Flange 458 may be attached to at least one edge of second enclosure 454 in a direction normal to a plane (e.g., of major face 450) of second enclosure 404. To attach first enclosure 452 to second enclosure 454, an internal surface of flange 458 may create a frictional fit between an edge (e.g., flange 456) of first enclosure 452 and flange 458.

Figure 5:
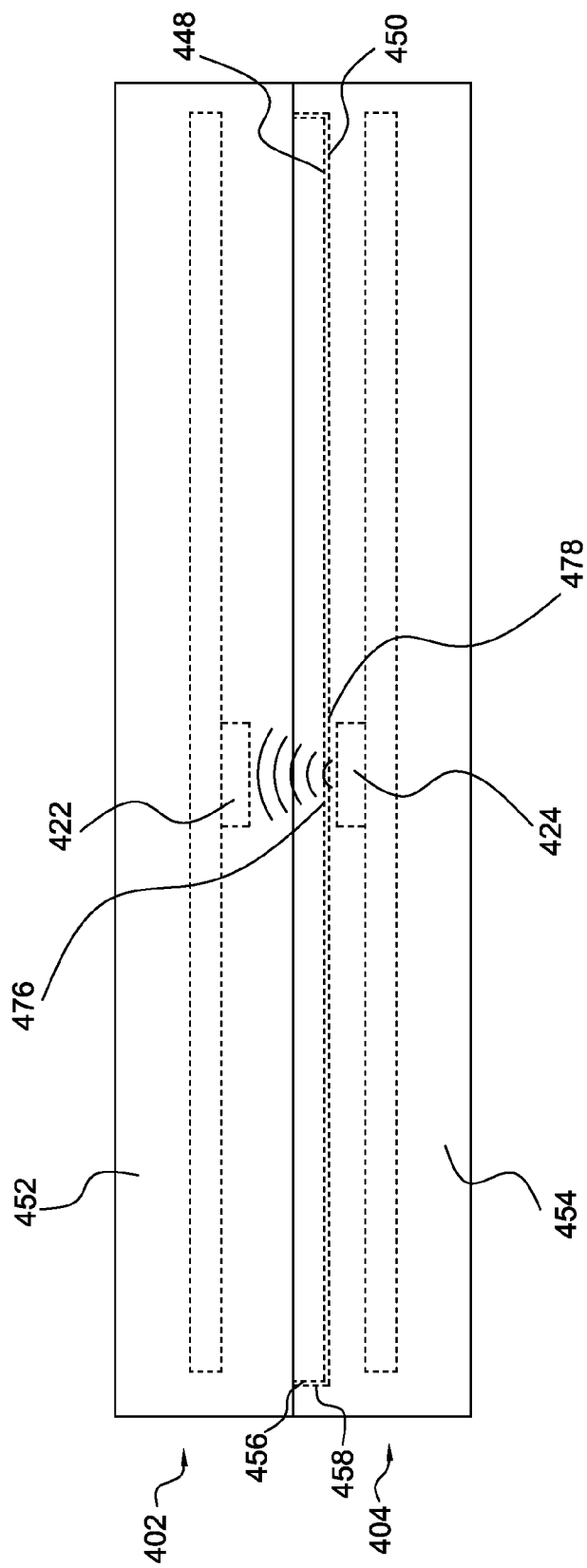
FIG. 5 is schematic side view of the flanged modules of FIG. 4, showing major faces of the modules in contact with one another.

FIG. 5 shows major faces 448 and 450 in contact with one another (a small gap is shown between faces 448 and 450, but this is only to clarify that faces 448 and 450 are not the same surface). In some embodiments, major faces 448 and 450 may be separated by a gap. Each of major face 448 of the first enclosure 452 and major face 450 of the second enclosure 454 may include a respective coupling surface 476 and 478 configured to enable transmission and/or reception of EHF electromagnetic signals. As shown in FIG. 5, faces 448 and 450 are respective faces of first and second electronics modules that oppose each other, for example, when first and second electronics modules 402 and 404 are attached.

Figure 6:
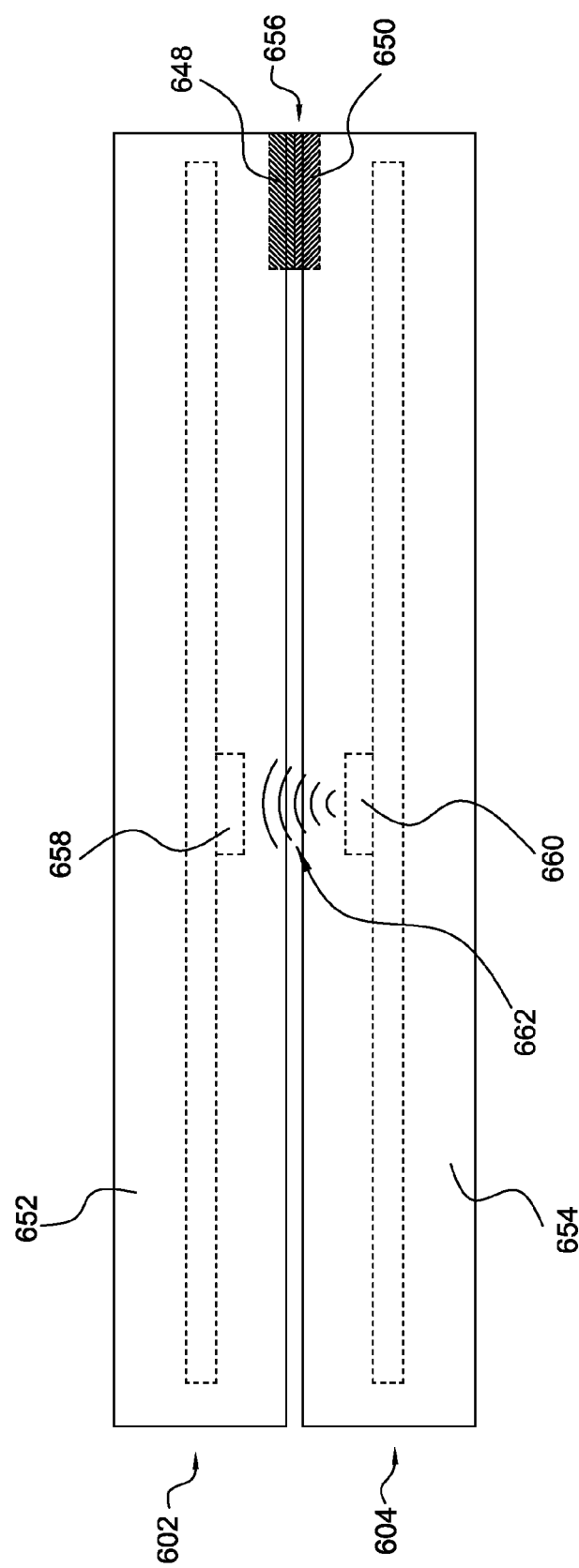
FIG. 6 is a side view of first and second modules including a manually releasable attachment system for attaching a first enclosure to a second enclosure.

FIG. 6 illustrates a manually releasable attachment system 656. System 656 may be configured to attach (or releasably attached) a first enclosure 652 of a first electronics module 602 to a second enclosure 654 of a second electronics module 604. Manually releasable attachment system 656 may enable first enclosure 652 to be reversibly attached to second enclosure 654. First enclosure 652 may be similar to first enclosure 452, and second enclosure 654 may be similar to second enclosure 454 of FIG. 4. Manually releasable attachment system 656 may include a first magnet 648 incorporated in first enclosure 652, and a second magnet 650 incorporated in second enclosure 654 such that a magnetic interaction between first magnet 648 and second magnet 650 releasably attaches first electronics module 602 to second electronics module 604. The attachment provided by system 656 may position first and second communication units 658 and 660 in relative proximity to one another to enable an EHF communication link 662 there between.

As shown in FIGS. 4-6, each of the enclosures of the respective modules may be substantially planar, may share substantially the same outline, and may be configured to form a stack in combination with other enclosures of a modular electronics system in which the respective modules may be included. Each of the modules and/or their respective enclosures may have a curvature that configures the module complex to have a curvature that could be either concave or convex, or to include faces that have compound curvatures or other configurations.

Figure 7A:
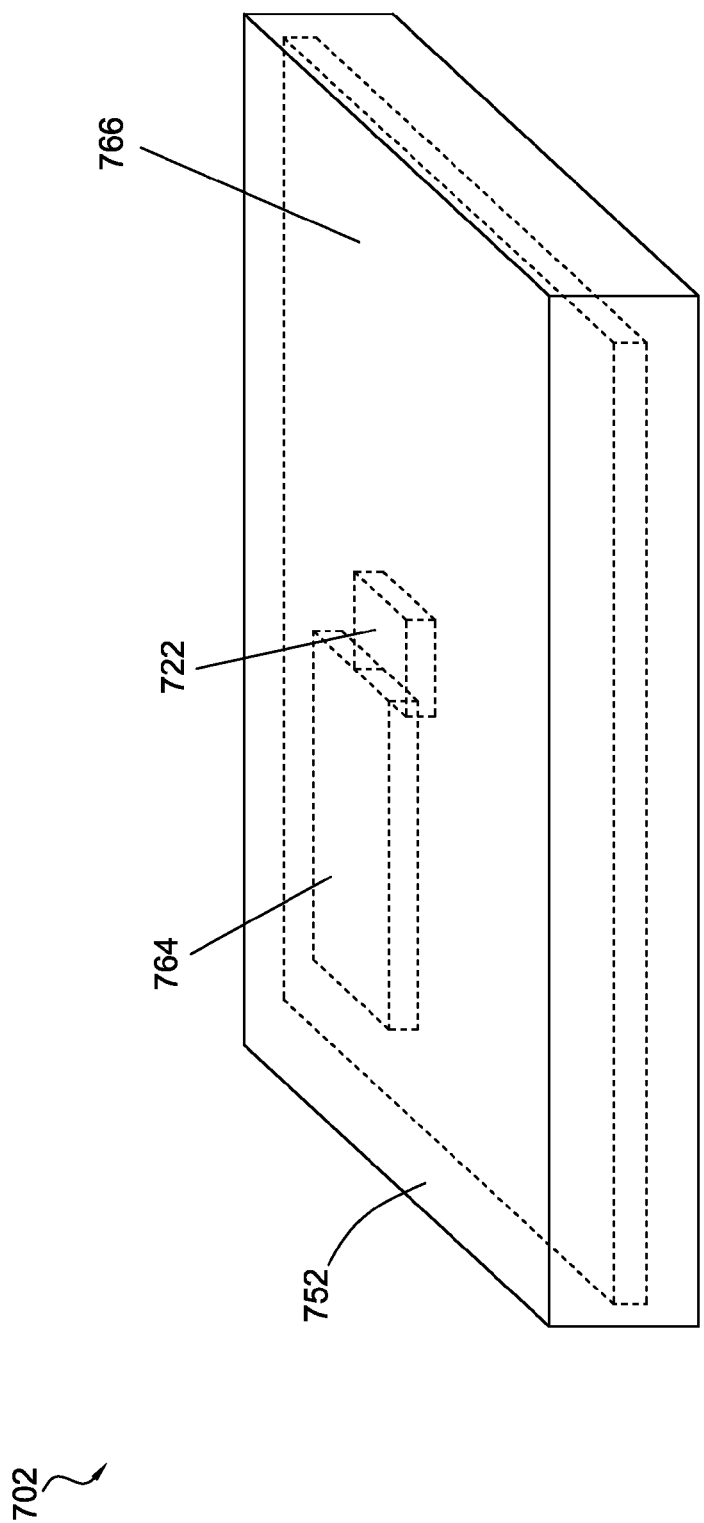
FIG. 7A, FIG. 7B and FIG. 7C are schematic isometric views showing port characteristics of first and second electronics modules.

FIG. 7A shows a first electronics module 702 including a port characteristic. First electronics module 702 may be similar to one or more of the electronics modules described above. The port characteristic may be a structure of a waveguide or may be an other EHF conducting component or a dielectric material that forms a port for the module. The dielectric material could be an aperture formed in the module.

As shown in FIG. 7A, the port characteristic may include a first dielectric waveguide 764. The first dielectric waveguide 764 may extend between a transducer (not shown) of a first communication unit 722, and a first exterior surface 766 of first electronics module 702. First dielectric waveguide 764 may conduct an EHF electromagnetic signal between the transducer of the first communication unit 722 and first exterior surface 766. Although FIG. 7A depicts waveguide 764 to be generally rectangular, a waveguide according to aspects of the present disclosure may include and/or be a lens, an aperture, a slot, a spreader, a grid, or any suitable combination thereof.

Figure 7B:
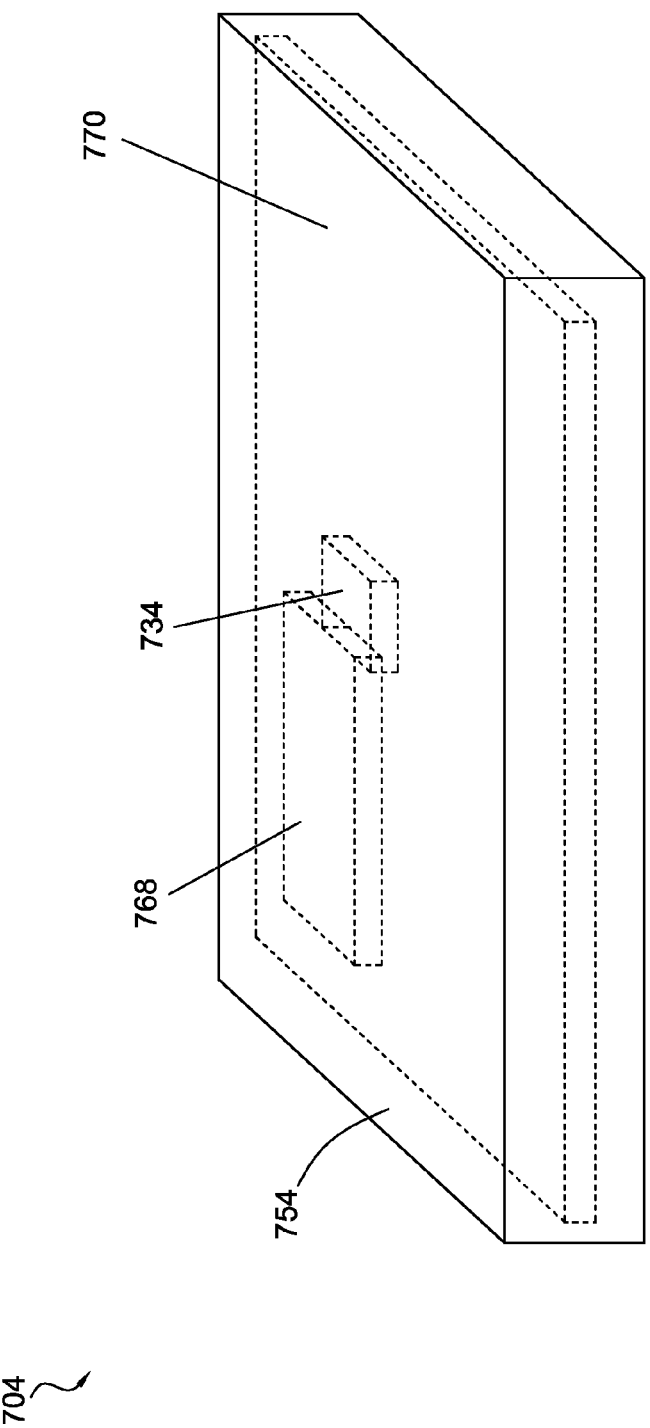

Similarly, FIG. 7B illustrates a second electronics module 704 including a second communication unit 734 and a dielectric waveguide 768. Second dielectric waveguide 768 may extend between a transducer (not shown) of second communication unit 734 and a second exterior surface 770 of second electronics module 704. Waveguide 768 may conduct an EHF electromagnetic signal between the transducer of second communication unit 734 and second exterior surface 770.

Figure 7C:
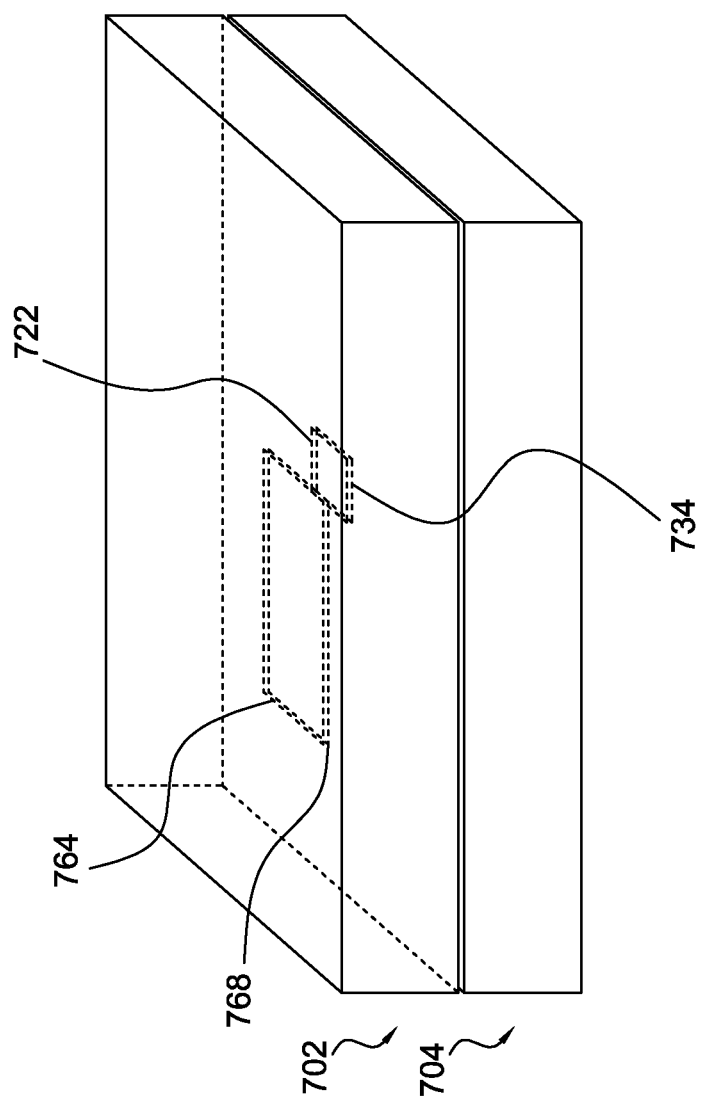

In an embodiment shown in FIG. 7C, first dielectric waveguide 764 may align with second dielectric waveguide 768 for conducting the EHF electromagnetic signal between the transducer of the first communication unit 722 and the transducer of the second communication unit 734 through a port characteristic (not shown). First electronics module 702 may be similar to the first electronics module 102 of FIG. 2, and second electronics module 704 may be similar to second electronics module 104 of FIG. 2.

In an embodiment, one or more electronic modules may have an electrical coupling for power and/or data transmission. For example, an electrical path may be used by the modules for low-speed data transmission and the EHF communication may be used for high-speed data transmission.

Examples of various port characteristics are described in U.S. patent application Ser. No. 13/963,888, which is hereby incorporated in its entirety for all purposes.

Figure 8:
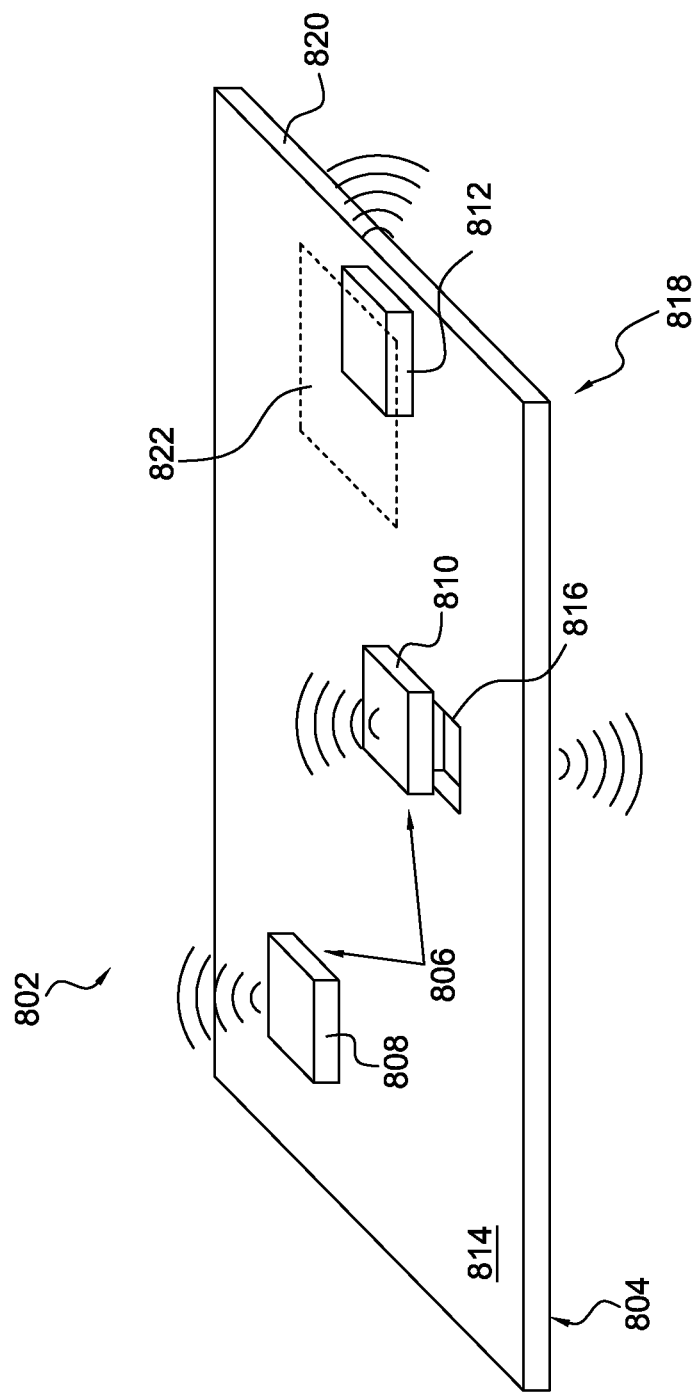
FIG. 8 is a schematic isometric view of an electronics module including a unidirectional IC package, a bi-directional IC package, and a side-launch IC package.

FIG. 8 shows an illustrative printed circuit board (PCB) assembly 802 which may make up a portion of a modular layer, such as one of first electronic module 102 and second electronics module 104 of FIG. 1. PCB assembly 802 may include a PCB 804 and one or more IC packages 806. PCB 804 may be any suitable structure configured for mounting electronic components. For example, the PCB 804 may be a standard printed circuit board sized appropriately for inclusion in an electronic device. IC packages 806 may be any suitable IC package configured to communicate electromagnetically in the EHF band. Examples of suitable IC packages are described in U.S. patent application Ser. No. 13/427,576, which is hereby incorporated in its entirety for all purposes.

IC packages 806 may be configured to provide a desired directionality in their communication, and may include one or more examples of a unidirectional IC package 808, a bidirectional IC package 810, and/or a side-launch (or edge-launch) IC package 812, or any combination thereof. Each IC package 806 may be electrically connected to one or more electrical circuits (not shown).

Unidirectional IC package 808 may be mounted on a major surface 814 of PCB 804, and a ground plane (not pictured) of PCB 804 may block and/or reflect any electromagnetic (EM) signal from passing through PCB 804. Accordingly, an EM signal transmitted by unidirectional IC package 808 may propagate away from PCB 804 in a direction generally normal to major surface 814.

Bi-directional IC package 810 may propagate both in the normal direction and through PCB 804 through a window 816 formed in PCB 808. Window 816 may be any suitable opening (or aperture) in PCB 804 (e.g., in a metal or metalized structure within PCB 804) sized to allow an EHF band EM signal to pass through. In some examples, window 816 may be filled with a dielectric material that may facilitate pass-through of EHF signals. Accordingly, an EM signal transmitted by bidirectional IC package 810 may propagate away from PCB 804 in a direction normal to major surface 814 and also in a direction generally normal to an opposite major surface 818.

Side-launch IC package 812 may be mounted on PCB 804 near an edge 820 of PCB 804, and may be configured to propagate an EM signal in the EHF band in a direction generally away from edge 820 and generally parallel to major surfaces 814 and 818. Side-launch IC packages may include enhancement structures such as shaped ground planes and/or reflectors such as an overhead reflector 822. These and other structures are described in U.S. Provisional Application Ser. No. 61/616,970, which is hereby incorporated in its entirety for all purposes.

Figure 9:
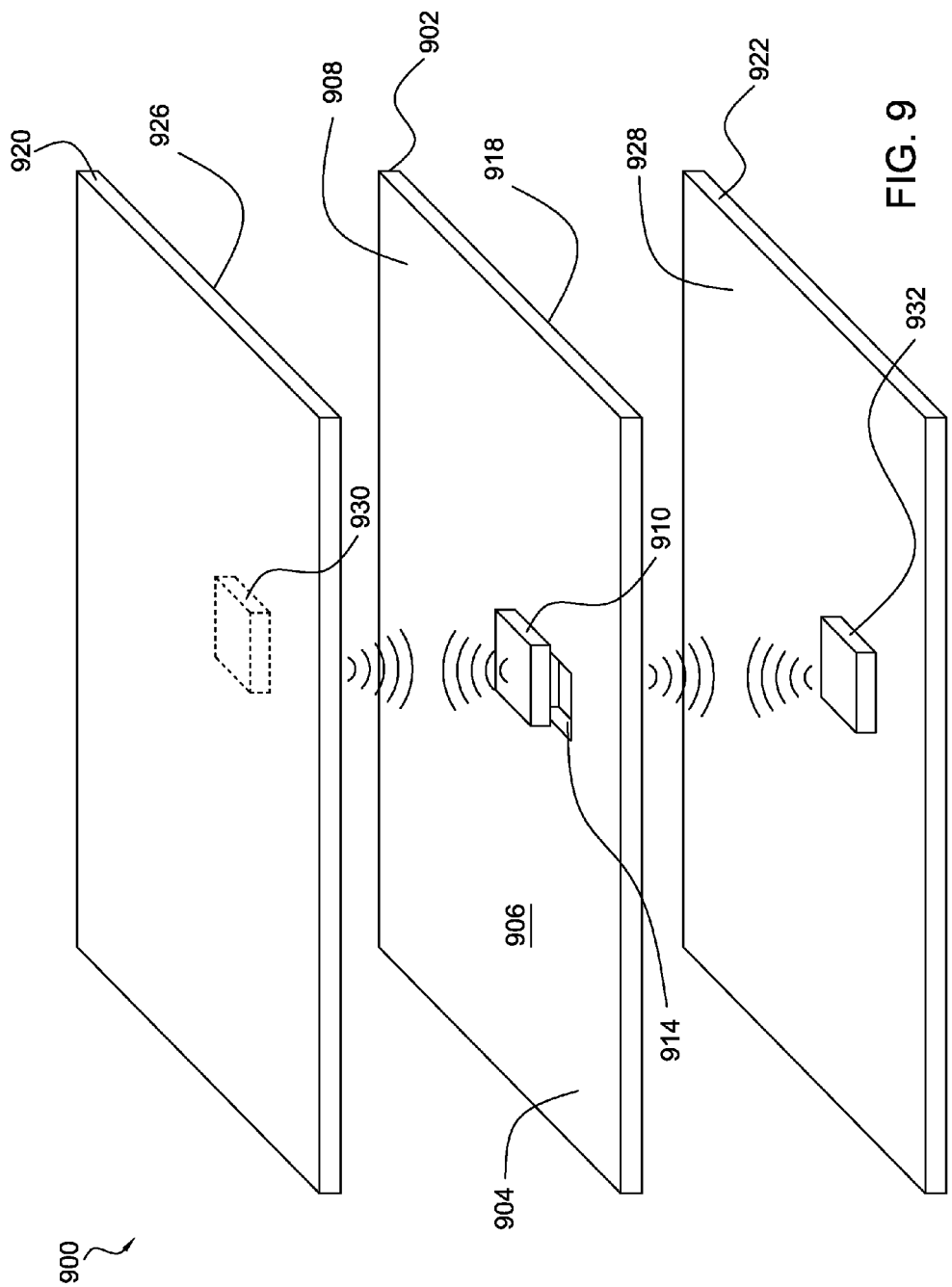
FIG. 9 is a schematic isometric view of a modular electronics system including a bi-directional IC package.

FIG. 9 illustrates a modular electronics system 900 which utilizes a bi-directional IC package. The modular electronics system 900 may include a first electronics module 902. First electronics module 902 may include a printed circuit board assembly 904 having a first PCB 906. First PCB 906 may have a first major surface 908 and an opposed second major surface 918. PCB 906 may define an aperture 914. PCB assembly 904 may include a bi-directional IC package 910 mounted to PCB 906, which may be configured to generate EHF band signals. Bi-directional IC package 910 may be disposed such that the EHF band signals generated by bi-directional IC package 910 propagate in a first direction normal to first major surface 908 of the first PCB 906, and in a second direction normal to second major surface 918 of the PCB 906 and away from the first direction through aperture 914 defined by first PCB 906.

Modular electronics system 900 may further include a second electronics module 920 having a second integrated circuit package 930, and a third electronics module 922 having a third integrated circuit package 932. A major surface 926 of second electronics module 920 may abut and/or be parallel to first major surface 908 of first PCB 906 of first electronics module 902, and a major surface 928 of third electronics module 922 may abut and/or be parallel to an opposed (or opposite) second major surface 918 of first PCB 906 of first electronics module 902. The EHF band electromagnetic signals generated by bi-directional IC package 910 may enable an EHF communication link between bi-directional IC package 910 and second IC package 930, and an EHF communication link between bi-directional IC package 910 and third IC package 932. In some embodiments, second IC package 930 may be aligned with bi-directional IC package 910 so as to permit formation of the EHF communication link between second IC package 930 and bi-directional IC package 910 for transmission of EHF band electromagnetic signals. Third IC package 932 may be coupled with (or to) bi-directional IC package 910 via aperture 914 defined by PCB 906 of first electronics module 902 so as to permit formation of the EHF communication link for transmission of EHF band electromagnetic signals.

Figure 10:
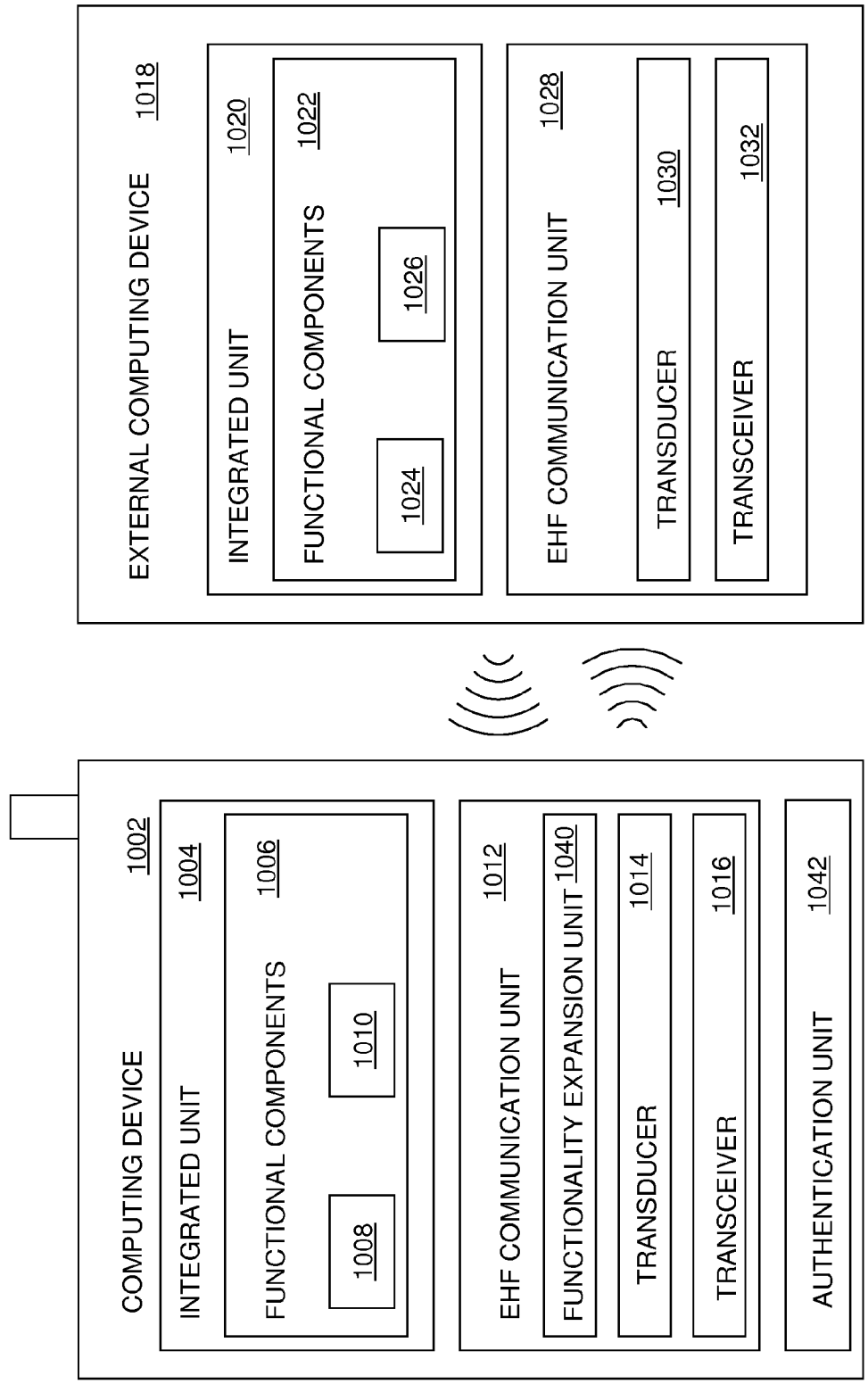
FIG. 10 is a block diagram of a computing device interacting with an external computing device.

FIG. 10 shows a block diagram of a computing device 1002 and an external computing device 1018. In some embodiments, computing device 1002 may be mobile computing device, such as a smartphone. In other embodiments, computing device 1002 may be a non-mobile computing device, such as a server, gaming console, computing device, television, smart appliances, or smart table. In some embodiments, external computing device 1018 may be mobile computing device, such as another smartphone, a hand-held electronic game device, or a mobile dock. In other embodiments, external computing device 1018 may be a non-mobile computing device, such as a game console, a server, a smart table, or a non-mobile dock.

Computing device 1002 may include an integrated unit 1004, an EHF communication unit 1012 and an authentication unit 1042. Integrated unit 1004 may include a plurality of functional components 1006. Plurality of functional components 1006 may include a first functional component 1008 and a second functional component 1010. The first and/or second functional components may include any suitable functional component or combination of functional components, such as processor circuitry, display circuitry, a volatile memory, a non-volatile memory, graphics circuitry, audio, touch interfaces, integrated cameras, and/or a power source.

EHF communication unit 1012 may be operatively coupled to integrated unit 1004. EHF communication unit 1012 may include a transducer 1014 configured to transmit and receive EHF electromagnetic signals, and convert between electrical signals and electromagnetic signals. EHF communication unit 1012 may include a transceiver 1016 operatively coupled to transducer 1014, and a functionality expansion unit 1040.

Similarly, external computing device 1018 may include an integrated unit 1020, and an EHF communication unit 1028. Integrated unit 1020 may include one or more functional components 1022. Functional components 1022 may include a third functional component 1024 and a fourth functional component 1026. EHF communication unit 1028 may be operatively coupled to integrated unit 1020. EHF communication unit 1028 may include a transducer 1030, which may be configured to transmit and receive EHF electromagnetic signals, and convert between electrical signals and electromagnetic signals. EHF communication unit 1028 may include a transceiver 1032 operatively coupled to transducer 1014.

EHF communication units 1012 and 1028 may be configured to support standards based protocols, such as MIPI, HyperTransport, QuickPath Interconnect (QPI) USB, PCIe, SATA, Displayport, Thunderbolt or other similar protocols. Electrical inputs and outputs of the EHF communication units may be connected to the electrical inputs and outputs of standards based communication links in computing devices 1002 and 1018. EHF communication units may be configured to have an asynchronous path for the conversion between electrical and electromagnetic signals. This asynchronous path may be configured to have an extremely low latency between the electrical signal input of EHF communications unit 1012 and the electrical signal output of EHF communications unit 1028 (or vice versus). This low latency signal path may be less than 1 ns. From a system perspective, when EHF communication unit 1012 and EHF communication unit 1028 are coupled, in some examples, the signal path appears as if it were a local electrical signal path and the latency through the EHF communication units may be transparent to the protocol that is being transported.

When connected through the EHF communication link, computing devices 1012 and 1018 appear from the system perspective as if they were one system due to the low latency, high bandwidth, and transparency of the EHF communication units.

Computing device 1002 and/or external computing device 1018 may be similar to electronic device 100 shown in FIG. 1 (or at least one of the modules thereof).

EHF communication unit 1012 of computing device 1002 may enable at least one of functional components 1008 and 1010 of computing device 1002 to be supplemented by at least one of functional components 1024 and 1026 of external computing device 1018.

In some embodiments, computing device 1002 may be self-contained and/or highly portable. Computing device 1002 may be an EHF enabled display apparatus that is operable to receive data from an active surface of external computing device 1018 via a close proximity coupling that may exist between the EHF enabled display apparatus and the active surface, and that processes data for presentation on the EHF enabled display.

In some embodiments, computing device 1002 may be a card-shaped device that approximates a size of a conventional credit card that may fit in a pocket, purse, or wallet. Computing device 1002 may be a relatively simple device that may include a display, a display controller, and EHF transceivers, and optionally can include input circuitry such as touch sensors. The active surface of external computing device 1018 may be an apparatus that can provide data, including display data, to computing device 1002 via EHF transceiver 1016. The active surface of external computing device 1018 may have limited input capabilities, and may be devoid of a display. In some embodiments, computing device 1002 can be a user interface to a device (e.g., external computing device 1018), which may not have a user interface. In effect, computing device 1002 may be a gateway or "window" to content contained and generated by the active surface of external computing device 1018 without needing the circuitry or resources necessary for independently generating and presenting such content itself.

In some embodiments, computing device 1002 may (only) be operative when it is placed in close proximity to external computing device 1018 (e.g., in close proximity or upon the active surface apparatus). When computing device 1002 is placed on (or in close proximity to) the active surface of external computing device 1018, a close proximity coupling can be established that enables the active surface to provide data to computing device 1002 (e.g., via an EHF communication link established between EHF communication units 1012 and 1028). Computing device 1002 can then display and/or process the data (or information) and process inputs (e.g., touch-screen inputs, finger recognition, etc.), and provide those inputs to the active surface of external computing device 1018.

In some embodiments, computing device 1002 may not function when computing device 1002 is not in proximity of an active surface. For example, when computing device 1002 is removed or spaced from, or otherwise located distally of the active surface of the external computing device 1018, computing device 1002 may be an inert, functionless device.

In other embodiments, computing device 1002 may function when computing device 1002 is not in proximity of the active surface. For example, when computing device 1002 is removed from (or distal) external computing device 1018, computing device 1002 may be configured such that one or more of functional components 1006 remain functional.

Computing device 1002 may be used with multiple different active surfaces. Each active surface can provide its local data to computing device 1002. The content presented by each active surface to a user via computing device 1002 may be different, but the underlying technology for enabling it may be the same. For example, if one active surface includes a security access panel and another active surface includes a general purpose computer, computing device 1002 may display a keypad when placed on the security access panel, and computing device 1002 may display a touch screen user interface when placed on the general purpose computer.

In some embodiments, computing device 1002 may include processing elements (e.g., functional components 1008 and 1010 may be functional processing components). Similarly, there may be processing elements (e.g., functional components 1026 and 1026) associated with external computing device 1018 that may be connected (e.g., to functional components 1008 and 1010) by establishing an EHF link (e.g., the EHF communication link) using EHF communication unit 1012 of computing device 1002 and EHF communication unit 1028 of external computing device 1018.

In some embodiments, integrated unit 1004 may request expansion of functional component 1008 (and/or functional component 1010) to include a functionality of functionality expansion unit 1040 of computing device 1002. Functionality expansion unit 1040 may generate instructions and transmit the instructions to transceiver 1016 by utilizing transducer 1014. EHF communication unit 1012 may establish the EHF communication link with EHF communication unit 1028 of external computing device 1018. Once the EHF communication link is established, the processing elements (or other elements) of external computing device 1018 may supplement the processing elements (or other elements) of computing device 1002 by exchanging the data by utilizing its transducer 1030 and transceiver 1032.

Modular devices, according to the present disclosure, may be configured to have low latency. Such configurations may include a reduced number or minimization of stages and elements in the signal path (e.g., the path in which an EHF communication link is formed), implementation of an asynchronous signal path (e.g., no registers or flip-flops), configurations in which a receiver may always be turned on (e.g., which may prevent startup or lock time delays), operation of a self-mixing demodulator with virtually no delay, and inclusion of bandwidth optimized circuits able to pass very high speed digital data.

In some embodiments, a phone with a SoC processor may not have sufficient processing power to drive a display or another computing device, but may be augmented by being connecting to a dock (or monitor) with a graphics card, and potentially other cores. In this case, when the phone is docked with the dock, it may utilize the processing power of the workstation or gaming system. The low latency and transparency of the EHF communication link may make the connection appear to be local on computing device 1002 and may utilize the performance of external computing device 1018. In some embodiments, external computing device 1018 may connect to many (or one or more) different computing devices and perform as an extension of the respective devices.

When computing device 1002 and external computing device 1018 come into close proximity, an EHF communications link may be established. In order to establish the EHF communication link, EHF communication unit 1028 and EHF communication unit 1012 may first determine whether or not a partner unit (e.g., the other of EHF communication units 1012 and 1028) is within close proximity, and may determine whether a reliable connection can be established. If EHF communication units 1028 and 1012 have determined that a connection may be established, EHF communication unit 1012 and EHF communication unit 1028 may exchange information. The information exchanged may include signal strength, coding, manufacturer ID, device ID, authentication information, and/or protocol-related information. The EHF communication units may use the information exchanged to determine whether or not to establish the EHF communication link. The establishment of the link may depend on one more of the following criteria: received signal strength in the computing device (and/or the external computing device), the manufacturer and/or device IDs, authentication, and protocol which may be necessary for communication. In addition, the authentication information may determine whether or not computing device 1002 has access to one or more of the resources of external computing device 1018 (e.g., functional components 1006). The authentication information may determine whether or not external computing device 1018 has access to resources of computing device 1012 (e.g., functional components 1022).

Once it has been determined that a connection may be established using a common protocol and all other conditions (including, but not limited to the conditions listed above) have been satisfied, EHF communications unit 1012 and EHF communications unit 1028 may establish a communications link using a common protocol. The common protocol may be standards based, such as MIPI, HyperTransport, QuickPath Interconnect (QPI) USB, PCIe, SATA, Displayport, Thunderbolt or other similar protocols. If the connection is established using a low-latency protocol, such as HyperTransport, QPI, or PCIe, functional components on each side of the link may be accessible as if they were local, on-board functional components. A dynamic, reconfigurable computing system may be realized by coupling multiple computing devices together using EHF communications links. Processing resources, memory, input/output devices may be spread across one or more computing devices. A host operating system on computing device 1002 may be configured to migrate processes to external computing device 1018, use additional memory resources on external computing device 1018, spawn additional processes to run on external computing device 1018, allocate memory in external computing device 1018, and utilize functional components 1022 of external computing device 1018 upon establishment of the EHF communication link.

In some embodiments, computing device 1002 and external computing device 1018 may exchange information relating to the available system resources and functional components on the respective computing devices. The information may contain data indicating the presence, identification information, current status, and accessibility of functional components, such as cameras, HDMI ports, Ethernet ports, Wireless access, memory, processing components, display elements, etc. The information may contain data indicating the status of the functional components. This status may contain information such as whether or not an HDMI port is attached to an external display and the type of display it is attached to. It may also contain information about the status of the Ethernet port, including Ethernet address, IP address, and routing information.

In some embodiments, a coupling surface of computing device 1002 may be similar to first coupling surface 476 of first enclosure 452 shown in FIG. 4. The coupling surface of computing device 1002 may include a port characteristic having a waveguide or other dielectric structure configured to propagate EHF electromagnetic signals. A port characteristic of computing device 1002 may be similar to one or more port characteristics of the waveguide 764 embedded in first electronics module 702 shown in FIG. 7A, or waveguide 768 embedded in second electronics module 704. The waveguide of computing device 1002 may include a dielectric. The coupling surface of computing device 1002 may mate with a coupling surface of external computing device 1018 to permit the EHF communication link at an appropriate relative proximity and relative orientation. For example, computing device 1002 may be placed at a pre-defined angle (or an angle in a pre-defined range or angles) on external computing device 1012 to establish the EHF communication link. The external computing device 1018 may include an apparatus for docking computing device 1002 at an appropriate proximity to enable the EHF communication link.

In some embodiments, authentication unit 1042 of computing device 1002 may authenticate external computing device 1018 to establish the EHF communication link. For example, computing device 1002 may have a capability to mate with one or more types of external computing devices which have capabilities of establishing an EHF communication link. However, owing to privacy or security issues, for example, a user of computing device 1002 may not desire to authenticate one or more of the computing devices, in which case authentication unit 1042 may be configured to not authenticate those external computing devices. In some embodiments, another entity (e.g., a manufacturer, or service-provider) may configure authentication unit 1042 to only authenticate preselected external computing devices.

Figure 11A:
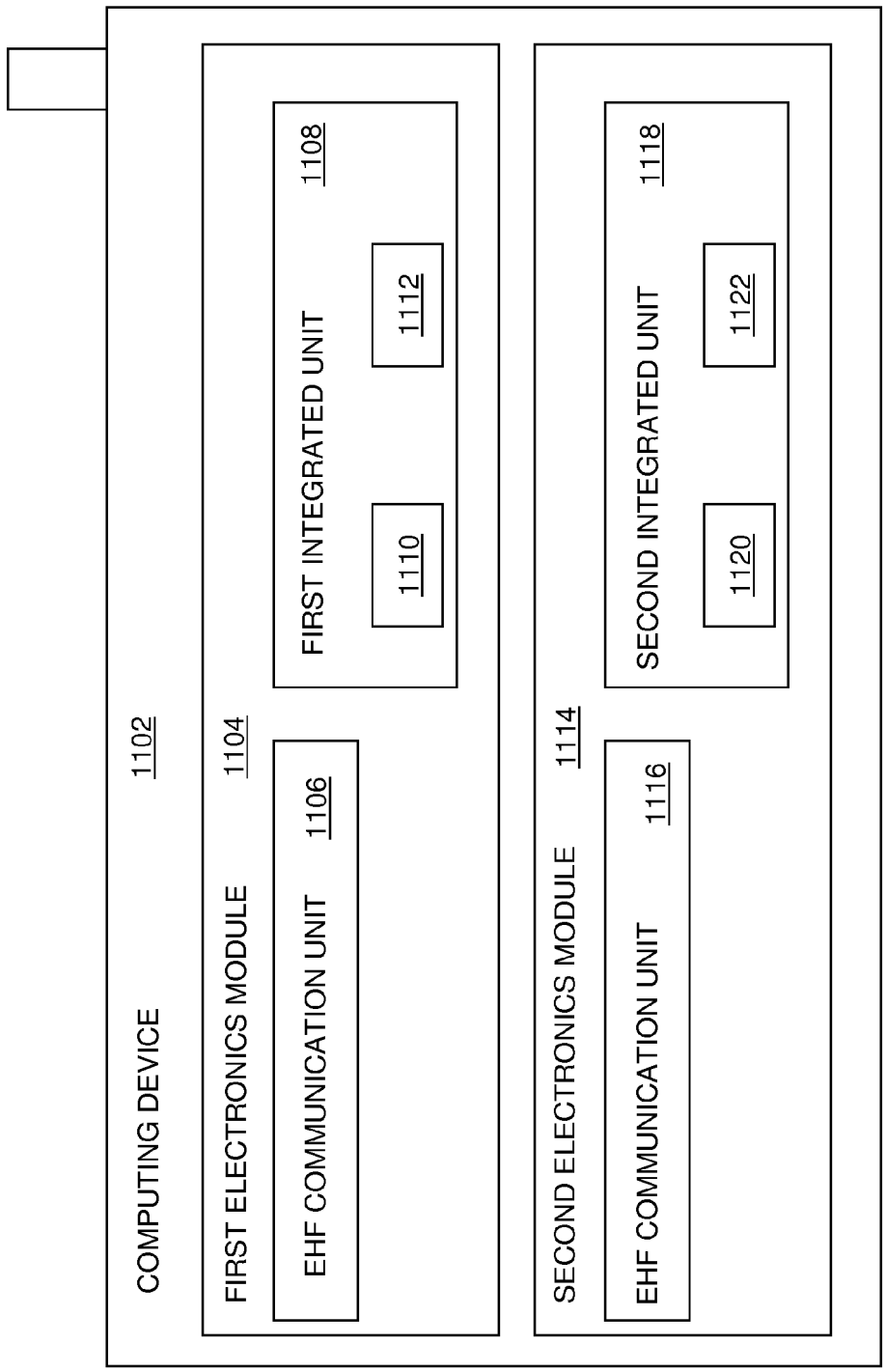
FIG. 11A is a block diagram of a computing device for sharing functional components amongst first and second electronics modules.

FIG. 11A illustrates a block diagram of a computing device 1102 for sharing functional components amongst different modules. Computing device 1102 may include a first electronics module 1104 and a second electronics module 1114. First electronics module 1104 and/or second electronics module 1114 may be similar to first and/or second electronics modules 102 and 104 of FIG. 2. First electronics module 1104 may include an EHF communication unit 1106, and a first integrated unit 1108 having a first plurality of functional components, such as functional components 1110 and 1112. Second electronics module 1114 may include an EHF communication unit 1116, and a second integrated unit 1118 having a second plurality of functional components, such as functional components 1120 and 1122.

First electronics module 1104 and second electronics module 1114 may be disposable within an appropriate relative proximity and relative orientation to permit an EHF communication link between first and second EHF communication units 1106 and 1116 to permit sharing of at least one of the functional processing components of the second plurality of functional processing components 1120 and 1122 with at least one of the functional processing components of the first plurality of functional processing components 1110 and 1112.

For example, functional component 1110 may include a processor/controller that can utilize memory resources available in functional component 1120. In another example, functional components 1110 and 1120 may each be a processor/controller and an operating system of computing device 1102 may use the combined processing capabilities of components 1110 and 1120 to process a code or function.

Figure 11B:
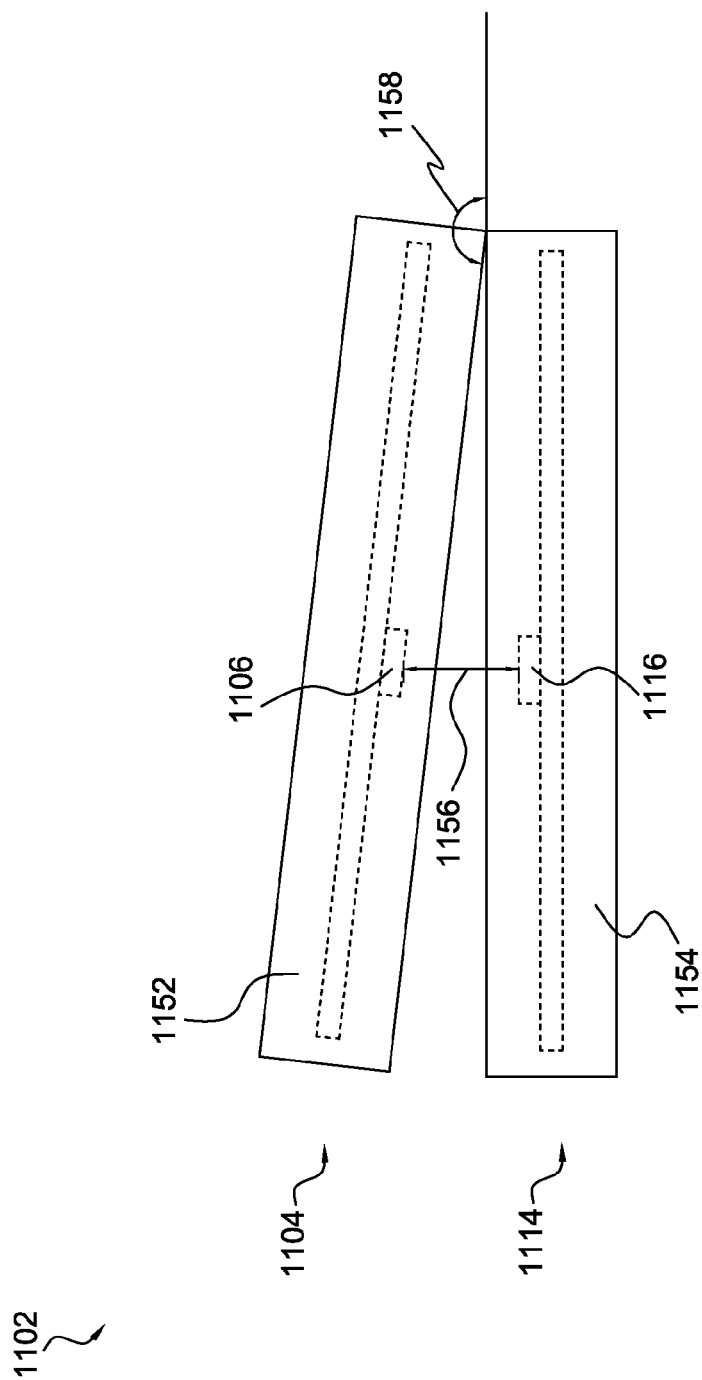
FIG. 11B is a schematic side view showing an exemplary relative proximity between the first and second modules to enable exchange of data.

As shown in FIG. 11B, each of first electronics module 1104 and second electronics module 1114 may include and/or be enclosed in respective first and second enclosures 1152 and 1154. In some embodiments, an EHF communication link between the first and second EHF communication units 1106 and 1116 may be established for sharing one or more of functional processing components 1120 and 1122 with one or more of functional processing components 1110 and 1112 when first enclosure 1152 and second enclosure 1154 are positioned at (or moved into) a pre-defined relative distance (e.g., a pre-defined relative distance indicated at 1156) and/or at a pre-defined angle (e.g., a pre-defined angle indicated at 1158).

In some embodiments, computing device 1102 may include a manually releasable coupling configured to retain first and second electronics modules 1104 and 1114 in contact with each other such that first and second EHF communication units 1106 and 1116 are in communication with one another via the EHF communication link, which may enable computing device 1102 to perform a function by sharing of at least one functional processing component 1110, 1112, 1120 and 1122 (see FIG. 11A).

In some embodiments, first and second electronics modules 1104 and 1114 may be similar to the first and second electronics modules 102 and 104 of FIG. 2A (and vice versa). For example, a first magnet may be disposed in first electronics module 1104, and a second magnet disposed in second electronics module 1114 such that a magnetic interaction between the first magnet and the second magnet may couple first electronics module 1104 and second electronics module 1114.

It may be noted that the computing device 1102 can have multiple electronic modules. These multiple electronic modules may share functional processing components by establishing one or more EHF communication links with one another. Examples of functional processing components 1110, 1112, 1120 and 1122 (see FIG. 11A) of the first and second integrated units 1108 and 1118 may include processor circuitry, display circuitry, a volatile memory, a non-volatile memory, graphics circuitry, or combinations thereof.

Figure 12A:
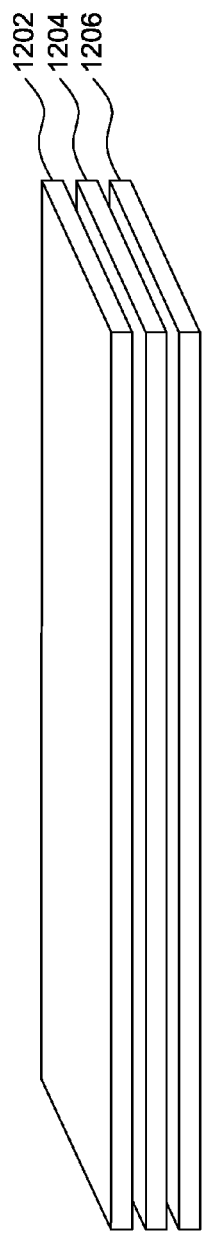
FIG. 12A, FIG. 12B and FIG. 12C show illustrative arrangements of various modules, according to the present disclosure.
Figure 12B:
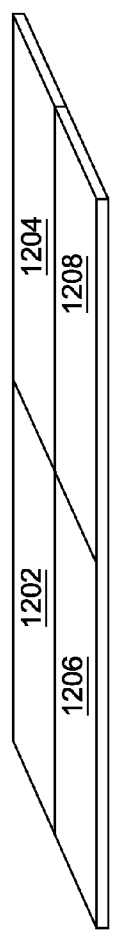
Figure 12C:
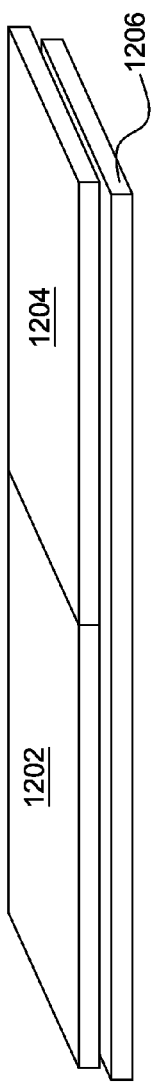

The above-described devices enable modular and/or reconfigurable assembly of electronics devices having various arrangements of modules. Assemblies may be accomplished manually, and various modules may be interchangeable, multi-functional depending on orientation with adjacent modules, and/or easily replaceable. FIG. 12A, FIG. 12B and FIG. 12C show illustrative arrangements of different modules. FIG. 12A shows three modules 1202, 1204 and 1206 stacked with major faces adjacent to each other as in FIGS. 1 and 2. In this example, a unidirectional IC package (e.g., similar to unidirectional IC package 808 in FIG. 8) or a bi-directional IC package (e.g., similar to bidirectional IC package 810 in FIG. 8) may be suitable for communication between modules. FIG. 12B shows four modules 1202, 1204, 1206 and 1208 arranged edge-to-edge. In this example, side-launch IC packages (similar to side-launch IC package 812 in FIG. 8) may be suitable for establishing one or more EHF communication links between the modules. FIG. 12C shows illustrative modules 1202, 1204 and 1206 in a mixed arrangement. In this example, side-launch IC packages may be suitable for establishing an EHF communication link between modules 1202 and 1204, and unidirectional and/or bi-directional IC packages may be suitable for establishing one or more EHF communication links between module 1202 and 1206, and/or between module 1204 and module 1206.

Modules shown in the drawings, such as those shown in FIGS. 1-2B, 4-9, and 11B-12C are shown to be generally rectangular in shape. However, modules according to the present disclosure may include and/or be any suitable shape, such as a non-rectangular shape (e.g., a more organically shaped object), such as a generally arcuate shape, an oval shape, a spherical or spheroid shape, a free-form shape, or any combination thereof. In some embodiments, interfacing surfaces of modules may be curved, and allow for rotational continuity.

One or more modules, according to the present disclosure, may be wearable and/or have wearable shapes (e.g., shaped to conform to a user's body). For example, a modular electronics system (or device) may include a wearable sports camera having replaceable storage modules. In some embodiments, the wearable sports camera may be shaped into a helmet.

In some embodiments, sliding and/or rotating contact (or interfaces) may be made between modules. For example, a modular device may include first and second modules, and the first module may be slidingly and/or rotationally engageable with the second module. The modular device may be variable in form, and absolute position between the first and second modules may convey user input. For example, a user may place the first module (e.g., a handset, such as a smartphone) on a first component of the second module. The second module may be a kiosk, and the first component may be a track or track pad. The track may be substantially horizontal. In some embodiments, the track may be substantially vertical. The modular device may be configured such that sliding (or moving) the first module back and forth on the second module (or in any other suitable vector, or change thereof) allows the user to "scroll" across selections which may be displayed on the first module and/or the second module. In some embodiments, the selections may be stored on the first module. In other embodiments, the selection may be store on the second module. Examples of embedded waveguides and positional measurement systems, which may be suitable for sliding and/or rotating contact between modules, are disclosed in co-pending U.S. patent application Ser. Nos. 13/922,062 and 13/524,956, which are hereby incorporated by reference in their entireties for all purposes.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

What is claimed is:

1. A method of configuring an electronic device comprising first and second electronics modules, the first electronics module including a first communication unit, the first communication unit including a transducer configured to transmit and/or receive an extremely high frequency (EHF) electromagnetic signal, and to convert between electrical signals and electromagnetic signals, and an integrated circuit including at least one of a transmitter circuit and a receiver circuit that is operatively coupled to the transducer, a first operative component that is electrically connected to the first communication unit, and a first enclosure enclosing the first operative component and the first communication unit, the first enclosure including a major face, the second electronics module including a second communication unit, the second communication unit including a transducer configured to transmit and/or receive an EHF electromagnetic signal, and to convert between electrical signals and electromagnetic signals, and a second integrated circuit including at least one of a transmitter circuit and a receiver circuit that is operatively coupled to the transducer, a second operative component electrically connected to the second communication unit and a second enclosure enclosing the second operative component and the second communication unit, the second enclosure including a major face, the method comprising:

orienting the major face of the first enclosure of the first electronics module to be in contact with the major face of the second enclosure of the second electronics modules;

releasably attaching the major face of the first enclosure of the first electronics module to the major face of the second enclosure of the second electronics module through a manually releasable attachment system; and establishing an EHF communication link between the first and second communication units when the major face of the first enclosure of the first electronics module is attached to the major face of the second enclosure of the second electronics module through the manually releasable attachment system.

2. The method of claim 1, wherein the first electronics module includes a first power supply configured to power the first electronics module independent from the EHF communication link between the first and second electronics modules.

3. The method of claim 2, wherein the second electronics module includes a second power supply configured to power the second electronics module independent from the EHF communication link between the first and second electronics modules.

4. The method of claim 2, further comprising powering the second electronics module by the first power supply through the EHF communication link between the first and second electronic modules.

5. The method of claim 4, wherein powering the second electronics module involves inductively transmitting power from the first electronics module to the second electronics module.

6. The method of claim 1, further comprising attaching a third module to at least one of the first and second electronics modules, wherein the third module includes a third operative component.

7. The method of claim 6, wherein the third module is a power module, and the third operative component is a power supply configured to supply power for the first and second electronics modules when coupled either directly or indirectly to the first and second electronics modules.

8. The method of claim 1, wherein the first operative component includes a user interface component, such that attaching the first electronics module directly or indirectly to the second electronics module forms an operative connection between the user interface component and the second operative component.

9. The method of claim 1, wherein the first electronics module comprises a magnet, and the second electronics module comprises a magnetically responsive element, and releasably attaching the major face of the first enclosure of the first electronics module to the major face of the second enclosure of the second electronics module through the manually releasable attachment system comprises:
positioning the modules so that the magnet is attractively coupled to the magnetically responsive element.

10. The method of claim 9, wherein the magnetically responsive element is a second magnet.

11. The method of claim 1, wherein at least one of the electronics modules is a flanged module that further comprises a flange extending from at least one edge of the flanged module, the manually releasable attachment system comprising the flange, and attaching the flanged module to another of the modules includes creating a frictional fit between an edge of the another module and an internal surface of the flange of the flanged module.

12. The method of claim 7, wherein configuring the electronic device comprises attaching the first electronics module to the second electronics module, and then attaching the power module to one of the first and second electronics modules.

13. The method of claim 7, wherein the first electronics module and the second electronics module are configured to receive power from the power module via inductive power transmission.

14. The method of claim 7, wherein in the configured electronic device at least one major face of each of the first electronics module, the second electronics module, and the power module contacts a major face of another of the first electronics module, the second electronics module, and the power module.

15. The method of claim 1, wherein the first electronics module further comprises:
a first dielectric waveguide extending between the transducer of the first communication unit and a first exterior surface of the first electronics module for conducting the EHF electromagnetic signal between the transducer of the first communication unit and the first exterior surface;
wherein the second electronics module further comprises a second dielectric waveguide extending between the transducer of the second communication unit and a second exterior surface of the second electronics module for conducting the EHF electromagnetic signal between the transducer of the second communication unit and the second exterior surface; and
when the first electronics module is attached to the second electronics module, the first dielectric waveguide aligns with the second dielectric waveguide for conducting the EHF electromagnetic signal between the transducer of the first communication unit and the transducer of the second communication unit.

16. A modular electronics system, comprising:
a first electronics module having a first communication unit including:
a transducer configured to transmit and/or receive an extremely high frequency (EHF) electromagnetic signal, and to convert between electrical signals and electromagnetic signals;
an integrated circuit comprising at least one of a transmitter circuit and a receiver circuit operatively coupled to the transducer;
a first operative component electrically connected to the first communication unit; and
a first enclosure enclosing the first operative component and the first communication unit, the first enclosure including a major face; and
a second electronics module having a second communication unit including:
a transducer configured to transmit and/or receive an EHF electromagnetic signal, and to convert between electrical signals and electromagnetic signals;
a second integrated circuit comprising at least one of a transmitter circuit and a receiver circuit operatively coupled to the transducer;
a second operative component electrically connected to the second communication unit; and
a second enclosure enclosing the second operative component and the second communication unit, the second enclosure including a major face;
wherein the first electronics module is releasable attached to the second electronics module through a manually releasable attachment system, and wherein the major face of the first electronics module is configured to contact the major face of the second electronics module and thereby form an EHF communication link between the first communication unit and the second communication unit when the first electronics module is attached to the second electronics module through the manually releasable attachment system.

17. The modular electronics system of claim 16, wherein each of the major face of the first enclosure and the major face of the second enclosure includes a coupling surface configured to enable transmission and/or reception of EHF electromagnetic signals.

18. The modular electronics system of claim 17, wherein each coupling surface includes a port component configured to facilitate formation of the EHF communication link between the first communication unit and the second communication unit by propagating an EHF electromagnetic signal.

19. The modular electronics system of claim 18, wherein each port component includes a waveguide configured to propagate the EHF electromagnetic signal.

20. The modular electronics system of claim 18, wherein each port component includes a conductive material and a dielectric waveguide, wherein the dielectric waveguide is configured to propagate the EHF electromagnetic signal.

21. The modular electronics system of claim 18, further comprising a power module having a power supply that is configured to supply power to the first and second electronics modules when coupled either directly or indirectly to the first and second electronics modules.

22. The modular electronics system of claim 21, wherein the first electronics module and the second electronics module are configured to receive power from the power module via inductive power transmission.

23. The modular electronics system of claim 21, further comprising a power module enclosure enclosing the power module, the power module enclosure having a major face, wherein at least one of the first electronics module and the second electronics module are configured to receive power from the power module via inductive power transmission when their major face comes into contact with the major face of the power module enclosure.

24. The modular electronics system of claim 16, wherein the manually releasable attachment system includes a first magnet incorporated in the first enclosure and a second magnet incorporated in the second enclosure such that a magnetic interaction between the first magnet and the second magnet releasably attaches the first electronics module to the second electronics module.

25. The modular electronics system of claim 16, wherein the manually releasable attachment system includes a flange extending from at least one edge of the first enclosure in a direction normal to the plane of the second enclosure, such that a frictional interaction releasably attaches the first electronics module to the second electronics module.

26. The modular electronics system of claim 16, wherein when the first enclosure and the second enclosure are releasably attached by the manually releasable attachment system, the port components of their respective coupling surfaces are disposed so as to facilitate formation of the EHF communication link between the first communication unit and the second communication unit.

27. The modular electronics system of claim 16, wherein each of the first enclosure and the second enclosure is substantially planar and shares substantially the same outline, and is configured to form a stack in combination with the other enclosures of the modular electronics system.

28. The modular electronics system of claim 16, wherein each of the first enclosure and the second enclosure is substantially planar, and is configured to form a stack in combination with the other electronics modules of the modular electronics.

29. The modular electronics system of claim 16, wherein each of the communication units provides at least one of unidirectional communication relative to a major face of the associated one of the first and second electronics modules, bidirectional communication relative to a major face of the associated one of the first and second electronics modules, and an edge-launch communication relative to a major face of the associated one of the first and second electronics modules.

30. The modular electronics system of claim 29, wherein at least one of the first and second electronics modules includes one or more further communication units for communication with another modular electronics system, wherein the one or more further communication units provides one or more of unidirectional, bidirectional, and edge-launch communication.

* * * * *